United States Patent
Deo et al.

(10) Patent No.: US 10,885,576 B2
(45) Date of Patent: Jan. 5, 2021

(54) WEBSITE TRACKING SYSTEM

(71) Applicant: PAYPAL, INC., San Jose, CA (US)

(72) Inventors: Harshal Deo, San Jose, CA (US); Prasanna Vinjamuri, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 374 days.

(21) Appl. No.: 15/858,075

(22) Filed: Dec. 29, 2017

(65) Prior Publication Data
US 2019/0205971 A1 Jul. 4, 2019

(51) Int. Cl.
| | |
|---|---|
| *G06Q 30/06* | (2012.01) |
| *H04L 29/08* | (2006.01) |
| *G06F 16/951* | (2019.01) |
| *G06F 3/0484* | (2013.01) |
| *G06F 3/0482* | (2013.01) |

(52) U.S. Cl.
CPC ....... *G06Q 30/0641* (2013.01); *G06F 16/951* (2019.01); *G06Q 30/0633* (2013.01); *H04L 67/22* (2013.01); *G06F 3/0482* (2013.01); *G06F 3/04847* (2013.01); *H04L 67/02* (2013.01); *H04L 67/146* (2013.01); *H04L 67/306* (2013.01)

(58) Field of Classification Search
CPC .............................................. G06Q 30/06–08
USPC ................................................ 705/26.1–27.2
See application file for complete search history.

(56) References Cited

U.S. PATENT DOCUMENTS

| | | | |
|---|---|---|---|
| 7,925,546 B2 | 4/2011 | Jacobi et al. | |
| 8,126,962 B1 | 2/2012 | Schnedler et al. | |
| 8,131,861 B2 | 3/2012 | Butler et al. | |
| 8,612,312 B1* | 12/2013 | Edwards | G06Q 30/0633 705/26.8 |
| 9,503,346 B2 | 11/2016 | Muret et al. | |
| 2005/0182688 A1* | 8/2005 | Martineau | G06Q 30/06 705/26.8 |
| 2015/0040200 A1* | 2/2015 | Gantman | G06F 21/44 726/7 |
| 2015/0269609 A1* | 9/2015 | Mehanian | G06Q 30/0246 705/14.45 |

OTHER PUBLICATIONS

4 Extensions to Create Killer Wishlists—That Aren't Amazon!, by Sandy Writtenhouse Dec. 9, 2015, https://www.makeuseof.com/tag/4-extensions-create-killer-wishlists-arent-amazon/ (Year: 2015).*

* cited by examiner

*Primary Examiner* — Ming Shui
(74) *Attorney, Agent, or Firm* — Haynes and Boone, LLP

(57) ABSTRACT

Systems and methods for providing a website tracking system include a system provider device that detects a first interaction between a user and a web browser executing on the user device while the web browser displays a first merchant website, the first interaction determined by a first downloaded code provided by the system provider device. In some embodiments, a second interaction between the user and the web browser is detected while the web browser displays a second merchant website, the second interaction determined by a second downloaded code provided by the system provider. Based on the first interaction and the second interaction, one or more entries of a system provider database is updated. The system provider device thereafter causes to be displayed, on a graphical user interface (GUI) of the user device, the one or more entries.

20 Claims, 13 Drawing Sheets

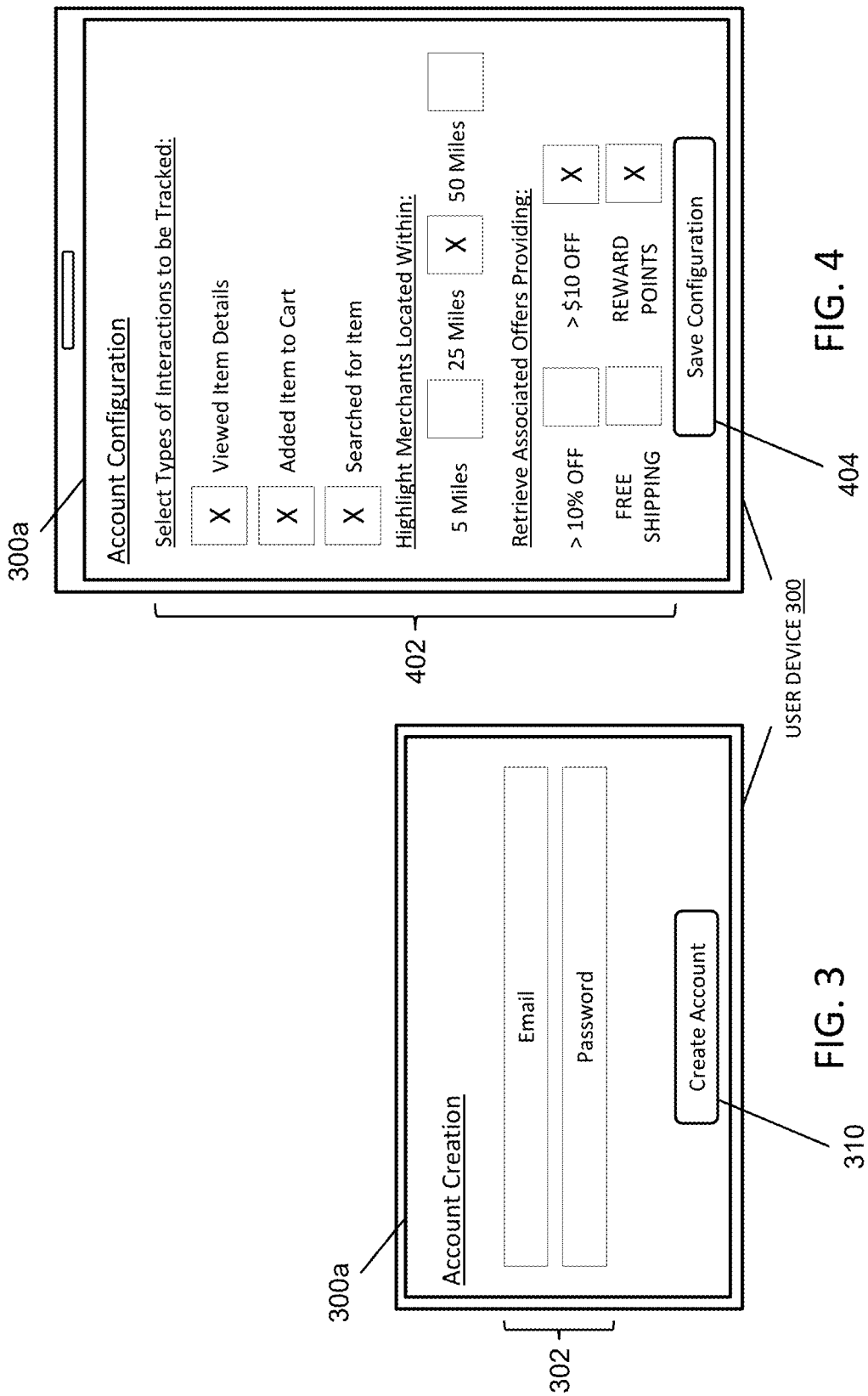

| Interaction ID | Merchant ID | Type | Sequence ID |
|---|---|---|---|
| 1 | A | Search for Product | ID-A |
| 2 | B | View Product Details | ID-B |
| 3 | A | View Product Details | ID-A |
| 4 | B | Add to Cart | ID-B |

FIG. 7

WEBSITE TRACKING SYSTEM

BACKGROUND

The present disclosure generally relates to a website tracking system, and more particularly to a system that tracks user activity across a plurality of merchant websites.

More and more individuals rely on electronic networks, such as the Internet, for a variety of services including purchasing products (e.g., from merchants and/or individuals), to exchange electronic mail, to conduct audio and/or video conferencing, to participate in online chats, to browse the World Wide Web, to play games, for electronic banking, and for electronic file storage and access, among others. Considering the case of purchasing products, it has become common practice for a merchant to offer their products or services by way of a merchant website. In various examples, merchant websites may be operated by individuals, by department stores, by online marketplace platforms, such as eBay™ Inc., of San Jose, Calif., Amazon.com™ Inc. of Seattle, Wash., and Alibaba Group Holding Limited, which operates Alibaba.com™, of Hangzhou, Zhejiang, China, as well as by other types of electronic commerce (e-commerce) platforms.

As a user browses through a particular merchant website, the user may view items, add items to their shopping cart, add items to a wish list, search for items, or otherwise express interest in an item so that the user may return to the merchant website at a future time to purchase the item. In addition, a user may routinely browse many merchant websites and may perform similar actions (e.g., view items, add items to their shopping cart or wish list, etc.) at each individual merchant website. Thus, the user may have items saved (e.g., in shopping carts, wish lists, etc.) separately for each of the plurality of merchant websites they have visited, and the user shopping experience is thus quite fragmented. Moreover, items that are discounted or items for which a particular merchant is offering a deal may only be advertised at the particular merchant website, further fragmenting the user shopping experience. Such a fragmented and inconvenient user shopping experience is undesirable for both merchants and users alike.

Thus, there is a need for a website tracking system that tracks user activity across a plurality of merchant websites.

BRIEF DESCRIPTION OF THE FIGURES

FIG. 3 illustrates an embodiment of a user device including a screen shot displaying an account creation screen;

FIG. 4 illustrates an embodiment of a user device including a screen shot displaying an account configuration screen;

FIG. 7 illustrates a system provider database including a plurality of entries, in accordance with some embodiments;

Figure 1:
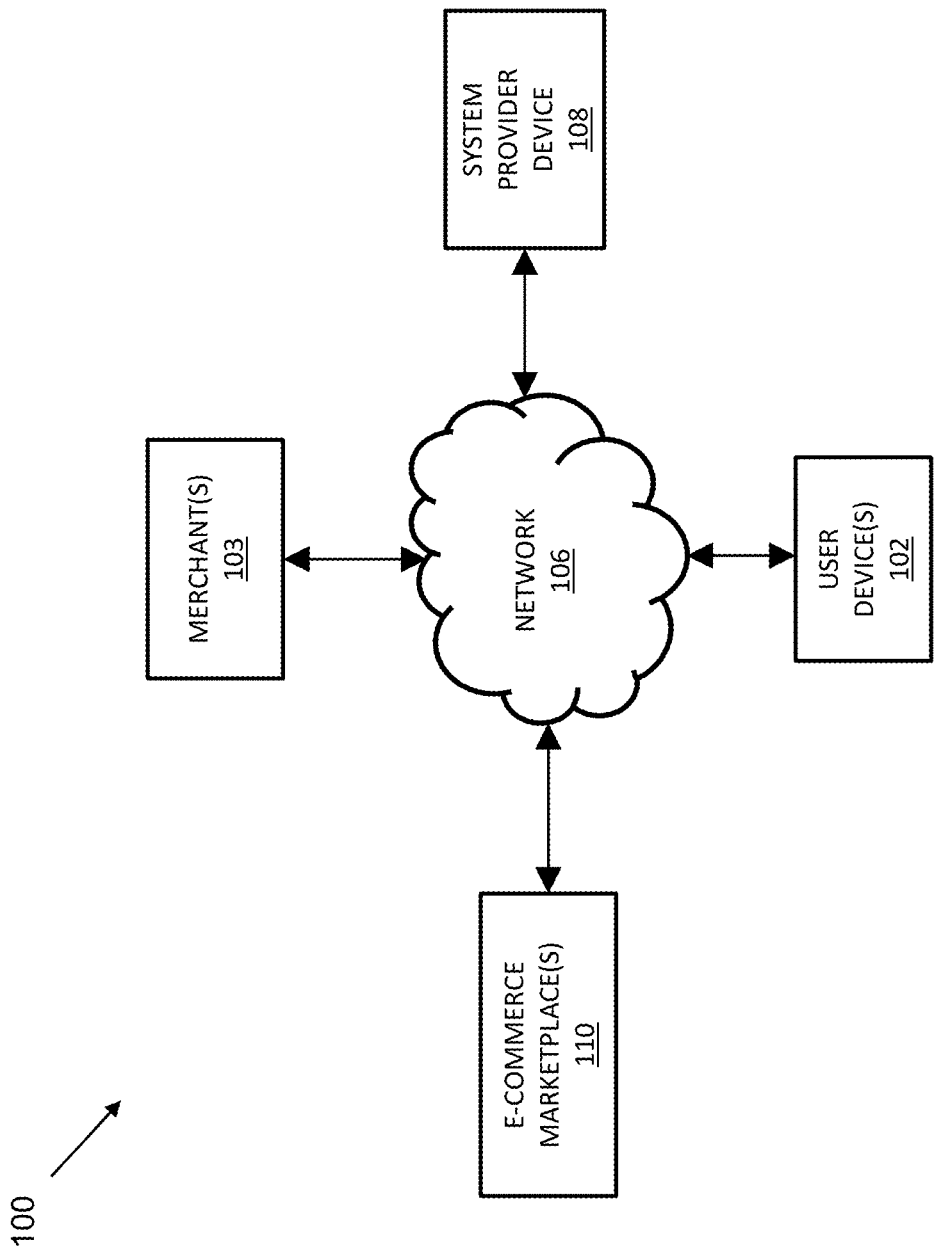
FIG. 1 is a schematic view illustrating a website tracking system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a website tracking system that tracks user activity across a plurality of merchant websites and provides a consolidated wish list or interest list that streamlines the user shopping experience. In some cases, as described below, the website tracking system may also automatically retrieve and save deals or offers to the consolidated wish list, further enhancing the user shopping experience. Additionally, embodiments described herein may be equally applicable to any type of user (e.g., individual, customer, merchant, or other type of user) operating any type of computing device such as a laptop, a desktop, a mobile device, or other appropriate computing device, and where the computing device is able to access the Internet (e.g., through an Internet connection). Furthermore, in various embodiments, the computing device(s) described herein may execute a mobile application that provides for one or more aspects of the website tracking system discussed below.

Among other uses, individuals increasingly rely on electronic networks, such as the Internet, for purchasing products and/or services (e.g., from merchants and/or individuals). The transactions may take place directly between a conventional or online merchant or retailer and the consumer, and payment is typically made by entering credit card or other financial information. Transactions may also take place with the aid of an online or mobile payment service provider such as, for example, PayPal™, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Currently, it has become common practice for a merchant to offer their products or services by way of a merchant website. In various examples, merchant websites may be operated by individuals, by department stores, by online marketplace platforms, such as eBay™ Inc., of San Jose, Calif., Amazon.com™ Inc. of Seattle, Wash., and Alibaba Group Holding Limited, which operates Alibaba.com™, of Hangzhou, Zhejiang, China, as well as by other types of electronic commerce (e-commerce) platforms.

As an example, a user may browse through a particular merchant website and may view items, add items to their shopping cart, add items to a wish list, search for items, or otherwise express interest in an item so that the user may return to the merchant website at a future time to purchase the item. In addition, the user may routinely browse many merchant websites and may perform similar actions (e.g., view items, add items to their shopping cart or wish list, etc.) at each individual merchant website. Thus, the user may have items saved (e.g., in shopping carts, wish lists, etc.) separately for each of the plurality of merchant websites they have visited, and the user shopping experience is thus quite fragmented. Moreover, items that are discounted or items for which a particular merchant is offering a deal may only be advertised at the particular merchant website, further fragmenting the user shopping experience. Such a fragmented and inconvenient user shopping experience is undesirable for both merchants and users alike.

By providing the website tracking system as described herein, a user is provided with a system that tracks user activity across a plurality of merchant websites and provides a consolidated wish list or interest list that streamlines the user shopping experience. In some cases, as described below, the website tracking system may also automatically retrieve and save deals or offers to the consolidated wish list, further enhancing the user shopping experience. In various embodiments, the website tracking system disclosed herein may include code (e.g., a website tracking code) provided by a payment service provider (e.g., PayPal™, Inc.) to a plurality of merchant web servers. In some examples, the plurality of merchant web servers may each store at least one website of the plurality of merchant websites. By way of example, "storing a merchant website" may include storing, at a merchant web server, hypertext markup language (HTML) files, cascading style sheets (CS S), JavaScript files, resource files, or other necessary files that collectively define a merchant website.

In some embodiments, a merchant web server, after receiving the website tracking code from the payment service provider, may embed the website tracking code within the merchant website. As a result, a merchant website downloaded by a web browser (e.g., executing on a user device) from a merchant web server may have the website tracking code embedded within the downloaded merchant website. In some cases, the embedded website tracking code may thus be executed by the web browser on the user device. In at least some examples, the website tracking code may be provided (e.g., either by the merchant web server or directly by the payment service provider) as an executable library accessible by a native mobile application on the user device.

Alternatively, in some embodiments, in response to receiving the website tracking code from the payment service provider, the merchant web server may embed a control code (e.g., including a control module or an inline frame <iframe>) within the merchant website. In some cases, a merchant website downloaded by a web browser (e.g., executing on a user device) from a merchant web server may thus have the control code embedded within the downloaded merchant website, while the website tracking code remains at the merchant web server. Thus, in some embodiments, the website tracking code may be executed on the merchant web server, while also communicating or interacting with the control code embedded within the merchant website and executed by the web browser on the user device.

In other embodiments, the payment service provider may provide a control code, as described above, to a merchant web server, while the website tracking code remains at the payment service provider. As previously described, the merchant web server may embed the control code within the merchant website, and a merchant website downloaded by a web browser (e.g., executing on a user device) from a merchant web server may thus have the control code embedded within the downloaded merchant web site. Thus, in some examples, the website tracking code may be executed on the payment service provider, while also communicating or interacting with the control code embedded within the merchant website and executed by the web browser on the user device.

Regardless of where the website tracking code is executed, and as described in more detail below, the website tracking code is configured to provide a variety of functionality. In various embodiments, the functionality provided by the website tracking code may be largely invisible to a user browsing a merchant website, so as not to disrupt a user's shopping experience. In some cases, the embedded website tracking code may provide a button, for example as part of a web browser displayed via a user interface (UI) of a user device, which upon clicking provides a user with various options and settings so that the user is able to configure the website tracking system, as discussed below.

By way of example, and in accordance with embodiments described herein, a user may browse to and interact with a plurality of merchant websites. As used herein, "interaction" between a user and a merchant website may include a user browsing a particular page of the merchant website, for example, by way of a web browser executing on a user device. Alternatively, and in some cases, interaction between a user and a merchant website may include clicking on an item to view detailed information about that item. In another example, interaction between a user and a merchant website may include a user adding an item to a shopping cart. In some embodiments, interaction between a user and a merchant may further include a user adding an item to a merchant website wish list. In still another case, interaction between a user and a merchant website may include searching for an item, for example, using a merchant website search tool functionality. While some examples of interaction between a user and a merchant website have been provided, those skilled in the art in possession of the present disclosure will recognize other types of events that would qualify as interaction between a user and a merchant website, while remaining within the scope of the present disclosure. In addition, while the interactions discussed herein are described as interactions between a user and a merchant website, it will be understood that such interactions may be between a user and a web browser that is displaying the merchant website or between a user and a merchant mobile application or a mobile browser displaying the merchant website.

In some embodiments, the website tracking system (e.g., by way of the website tracking code embedded within each of a plurality of merchant websites) may detect one or more interactions between a user and one or more merchant websites. In particular, the one or more interactions may identify one or more items that the user has expressed interest in, for example, by way of clicking on an item to view detailed information, by adding an item to a shopping cart, by saving an item to a merchant website wish list, by spending a particular amount of time browsing a particular page of the merchant website, by searching for a particular item, or by another available method. As a result of identifying the one or more items, the website tracking system may classify the identified items into one or more lists. In some cases, the one or more lists may be referred to as interest lists, which may be similar to wish lists, watch lists, or history lists employed by at least some existing e-commerce platforms. However, rather than a user having to manually create such a list, as is done for at least some existing e-commerce platforms, the one or more lists provided by the website tracking system may be automatically generated via machine intelligence algorithms based on the detected interactions between a user and the one or more merchant websites, in accordance with some embodiments.

In various embodiments, the website tracking system may use the one or more lists to provide an application programming interface (API). In some examples, an application (e.g., a mobile application) provided by the payment service provider (e.g., PayPal™, Inc.) may leverage this API to allow users to view and curate their personal interest lists. The application provided by the payment service provider may be downloaded from the payment service provider onto a user device for execution thereon. In some embodiments, the website tracking system disclosed herein may also automatically search for and identify deals that correspond to the one or more items contained within the one or more lists. In various cases, such identified deals may likewise be provided to a user via the payment service provider application. Additionally, and in some embodiments, a user may purchase items directly from the payment service provider application, without requiring the user to return to the original merchant website to complete the purchase transaction. Various other embodiments and advantages of the present disclosure will become evident in the discussion that follows and with reference to the accompanying figures.

Referring now to FIG. 1, an embodiment of a website tracking system 100 is illustrated. The website tracking system 100 includes a user device 102 operated by a user. In various embodiments, the user device 102 may include any type of computing device such as a laptop, a desktop, a mobile device, or other appropriate computing device operated by any type of user (e.g., individual, customer, merchant, or other type of user). While the embodiments herein are generally shown and described with reference to a single user device (e.g., user device 102) operated by a single user for the sake of clarity, it will be understood that various embodiments may include a plurality of user devices operated by a plurality of users at a plurality of user physical locations. In various examples, the user device 102 is coupled to a network 106 that is further coupled to a system provider device 108. For example, the user device 102 and the system provider device 108 are configured to communicate with one another by way of the network 106, for example by way of network communication devices, as discussed below.

In various examples, the embodiment of the website tracking system 100 further includes an e-commerce marketplace 110. The e-commerce marketplace 110 may include an e-commerce marketplace such as eBay™, Amazon™, Alibaba™, or any of a variety of other online marketplace platforms. More generally, the e-commerce marketplace 110 may include any of a plurality of electronic commerce (e-commerce) websites offering goods and/or services for sale from a merchant to a consumer (e.g., such as a user operating the user device 102). To be sure, in some examples, the consumer may be another merchant, an individual customer, or other type of user. As such, the e-commerce marketplace 110 may provide merchandise listings for the goods and/or services being sold. A "merchandise listing", as used herein, may include an image of an item for sale, a description of the item for sale, a price of the item for sale, as well as other relevant item information. In various embodiments, the e-commerce marketplace 110 includes one or more devices that are coupled to the network 106 that is further coupled to a system provider device 108. For example, the e-commerce marketplace 110 and the system provider device 108 are configured to communicate with one another by way of the network 106, for example by way of network communication devices, as discussed below.

The website tracking system 100 may also include a merchant 103. In various embodiments, the merchant 103 may include a merchant operating a physical merchant location or a merchant virtual storefront accessible to a user via a website (e.g., accessible through an Internet connection using a mobile device and/or a personal computer) or via a mobile application executing on the user's mobile device. It will be understood that various embodiments may include a single merchant at a single physical location, a plurality of merchants at a plurality of merchant physical locations, a single merchant having a plurality of merchant physical locations, a plurality of merchants operating a plurality of merchant virtual storefronts, and/or a single merchant operating a plurality of merchant virtual storefronts. In various examples, the merchant 103 includes one or more merchant devices that are coupled to the network 106 that is further coupled to a system provider device 108.

For example, the merchant 103 and the system provider device 108 are configured to communicate with one another by way of the network 106, for example by way of network communication devices, as discussed below.

In the embodiments, the merchant 103 may provide a physical location such as a department store, a restaurant, a grocery store, a pharmacy, a movie theater, a theme park, a sports stadium, and/or a variety of other merchant physical locations. Moreover, in some embodiments, the merchant 103 physical location may include a mobile merchant location such as a cart, kiosk, trailer, and/or other mobile merchant locations. In addition, in various embodiments, the merchant 103 may include a virtual storefront that serves to complement the merchant physical location. In still other embodiments, the merchant 103 may not include a merchant physical location, and may instead only include a merchant virtual storefront, as described above. In some examples, the merchant 103 may offer items for sale by way of merchandise listings provided via the e-commerce marketplace 110. In some examples, the merchant 103 may alternatively, or additionally, offer items for sale by way of merchandise listings provided via a merchant's own virtual storefront (e.g., accessible through a merchant website).

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the user device 102 may communicate through the network 106 via cellular communication, by way of one or more user network communication devices. In other examples, the user device 102 may communicate through the network 106 via wireless communication (e.g., via a WiFi network), by way of one or more user network communication devices. In yet other examples, the user device 102 may communicate through the network 106 via any of a plurality of other radio and/or telecommunications protocols, by way of one or more user network communication devices. In still other embodiments, the user device 102 may communicate through the network 106 using a Short Message Service (SMS)-based text message, by way of one or more user network communication devices.

The system provider device 108 may likewise couple to the network 106 via a wired or wireless connection. As described in more detail below with reference to FIG. 14, the system provider device 108 may include a website tracking engine, a communication engine, a user database, and a system provider database. Software or instructions stored on a computer-readable medium, and executed by one or more processors of the system provider device 108, allows the system provider device 108 to send and receive information over the network 106. Furthermore, the website tracking engine in the system provider device 108 may be configured to implement the various embodiments of the website tracking system as described herein.

In some examples, the system provider device 108 is configured to detect and monitor interactions between a user and one or more merchant websites. For purposes of this disclosure, the detected and monitored interactions may include interactions between a user and a virtual storefront provided by either of the merchant 103 or the e-commerce marketplace 110. Thus, for avoidance of doubt, a "merchant website" as described herein may include a website operated by a merchant 103 or a website operated by an e-commerce marketplace 110. In some embodiments, and as a result of identifying the one or more items, the system provider device 108 may classify the identified items into one or more lists, and use the one or more lists to provide an API. The system provider device 108 may thus use the API to provide an application which allows users to view and curate the one or more lists. In various embodiments, the website tracking system may be configured by a user to control the types of interactions between the user and the one or more merchant websites that are tracked.

In addition, in some embodiments, the system provider (e.g., operating the system provider device 108) may include a payment service provider such as, for example, PayPal™ Inc. of San Jose, Calif., that provides the website tracking system 100 for a user operating the user device 102, as well as any other users implementing the website tracking system 100. Information sent and received through the network 106 and user devices 102 may be associated with user accounts in a database located in a non-transitory memory, and any use of that information may be stored in association with such user accounts. Furthermore, the payment service provider may provide the website tracking system 100 for a plurality of different users, similarly as described for a user operating the user device 102, discussed below. Thus, references to a system provider operating a system provider device below may refer to a payment service provider operating a payment service provider device, or may refer to any other entity providing a website tracking system separate from or in cooperation with a payment service provider.

Figure 2:
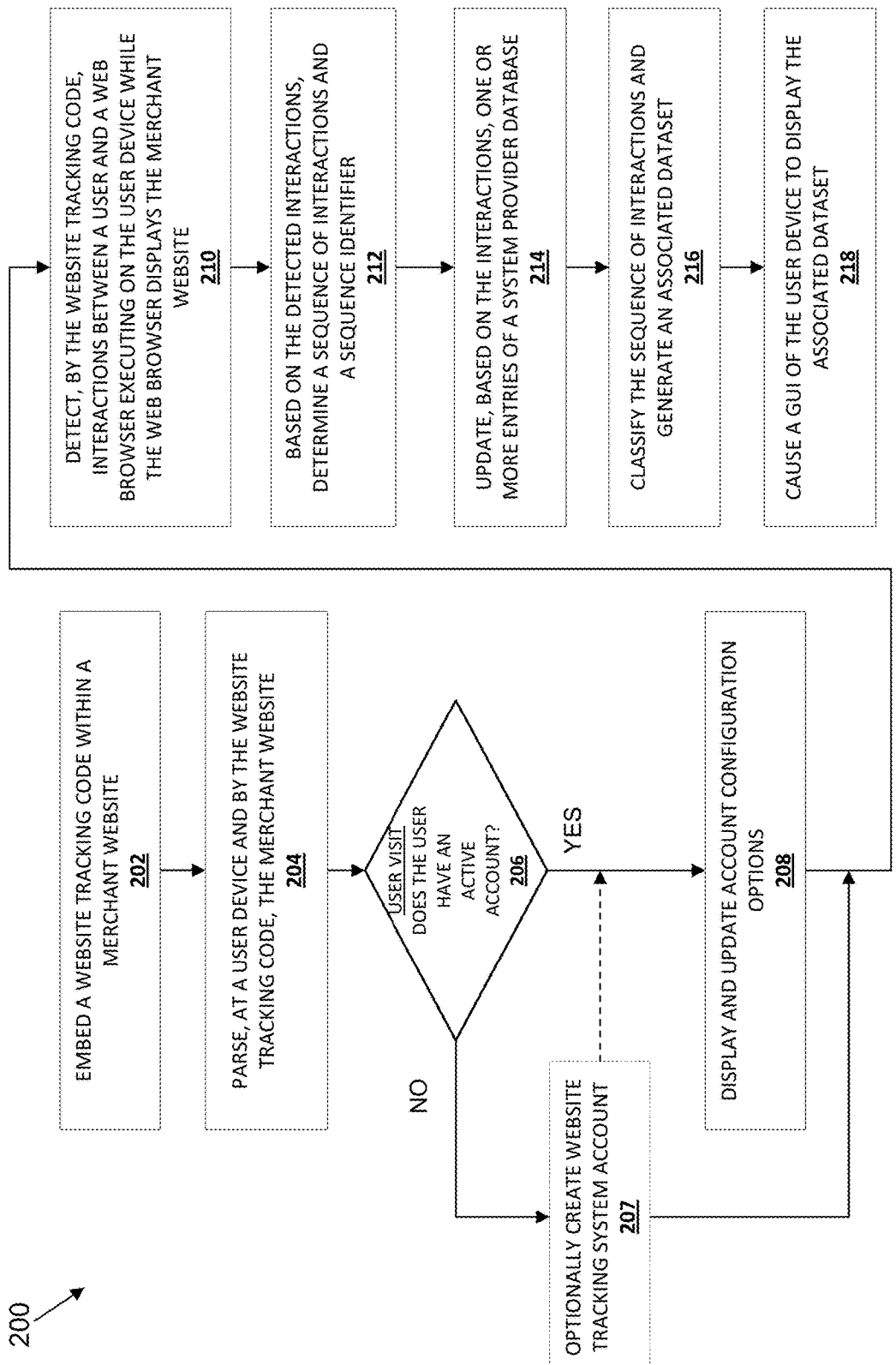
FIG. 2 is a flow chart illustrating an embodiment of a method for providing a website tracking system that tracks user activity across a plurality of merchant websites.

Referring now to FIG. 2, an embodiment of a method 200 for providing a website tracking system that tracks user activity across a plurality of merchant websites is illustrated. While some steps of the method 200 may involve direct user input (e.g., user configuration of the types of interactions to track), the functionality provided by the website tracking system 100 may not necessarily be visible to the user of the website tracking system 100. One of skill in the art in possession of the present disclosure will recognize that the method 200 may be performed for a plurality of different users operating a variety of different user devices at a variety of physical locations. It will also be understood that additional steps may be performed before, during, and/or after the steps described below with reference to the method 200. In particular, with reference to FIGS. 3-10, various aspects of the method 200 are illustrated and described.

Figure 5:
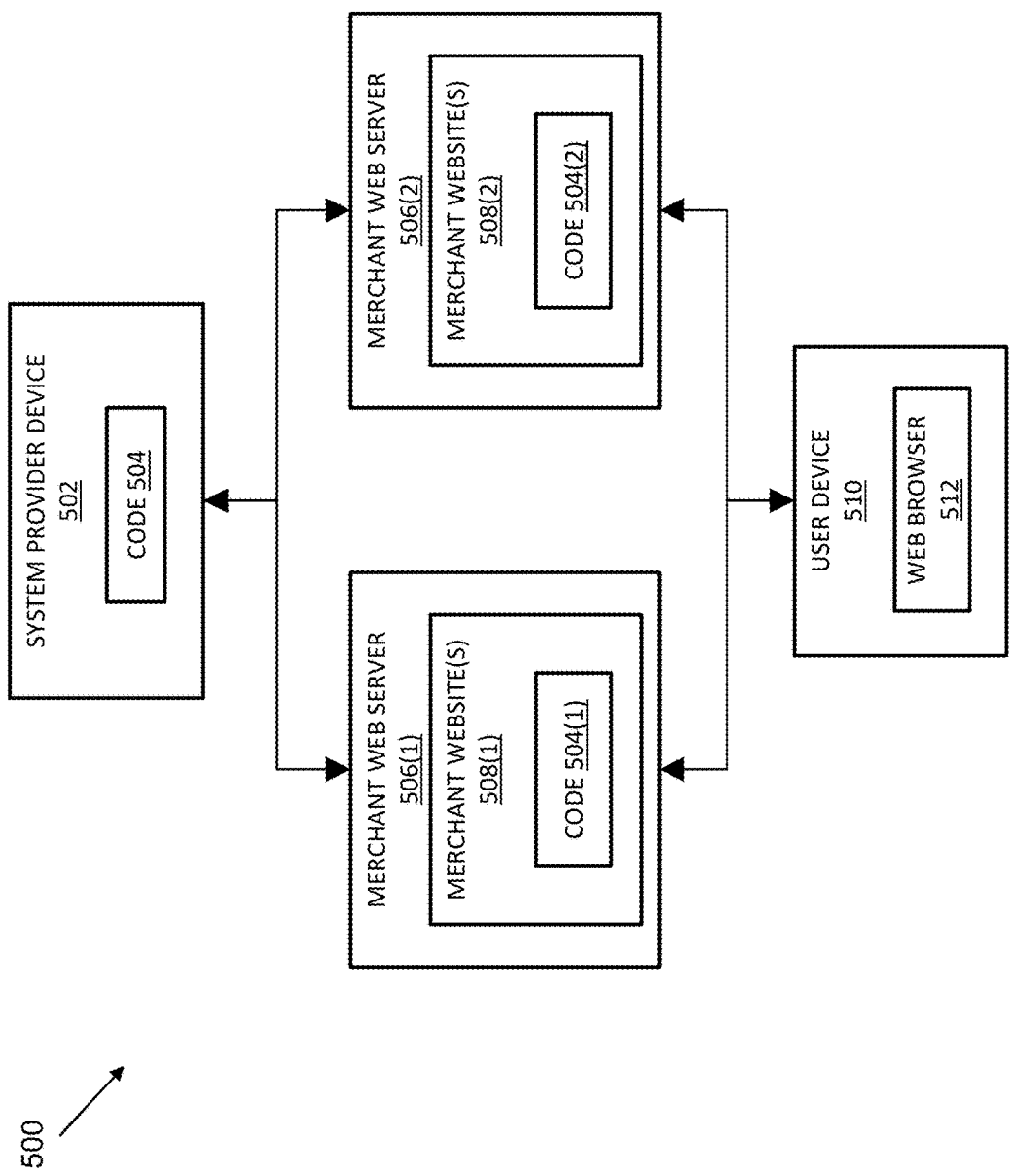
FIG. 5 illustrates an interface between a system provider device, merchant web servers, and a user device, in accordance with some embodiments.

The method 200 begins at block 202 where a website tracking code is embedded within a merchant website. With reference to FIG. 5, and in an embodiment of block 202, a system provider device 502, which may be the system provider device discussed above, provides a website tracking code 504 to a merchant web server such as a merchant web server 506(1) or a merchant web server 506(2). In at least some embodiments, the website tracking code 504 includes a Javascript code. In various examples, the merchant web servers 506(1) and 506(2) may store a merchant website 508(1) and 508(2), respectively. As noted above, storing the merchant websites 508(1), 508(2) may include storing, at the merchant web servers 506(1), 506(2), HTML files, CSS files, JavaScript files, resource files, or other necessary files that collectively define the merchant websites 508(1), 508(2).

After receiving the website tracking code 504, the merchant web server 506(1) may embed the website tracking code 504(1) into the merchant website 508(1), and the merchant web server 506(2) may embed the website tracking code 504(2) into the merchant website 508(2). For purposes of this discussion, the website tracking code 504(1) and 504(2) may be referred to as different instances of the same website tracking code 504 provided by the system provider device 502. Thus, in some embodiments, the merchant web server 506(1) may embed a first instance of a Javascript code into the merchant website 508(1), and the merchant web server 506(2) may embed a second instance of the Javascript code into the merchant website 508(2), to provide the functionality of the website tracking system described herein. Additionally, and in various examples, each of the website tracking code 504(1) and 504(2) may be configured differently for each of the merchant web server 506(1) and the merchant web server 506(2). In some cases, the system provider device 502 may provide different configurations of the code 504 to each of the merchant web server 506(1) and the merchant web server 506(2).

Alternatively, in some cases, the system provider device 502 may provide the same code 504 to each of the merchant web server 506(1) and the merchant web server 506(2), and the merchant web servers 506(1), 506(2) themselves may configure the code 504(1), 504(2) as needed. In some embodiments, as a result of embedding the website tracking code into each of the merchant websites 508(1) and 508(2), subsequent downloading of the merchant website 508(1) or the merchant website 508(2) from the merchant web server 506(1) or the merchant web server 506(2), by a web browser 512 executing on a user device 510, may have the website tracking code embedded within the downloaded merchant website 508(1) or 508(2). In some cases, the embedded website tracking code may thus be executed by the web browser 512 on the user device 510. In other embodiments, the merchant web server 506(1) may embed a control code within the merchant website 508(1), or the merchant web server 506(2) may embed a control code with the merchant website 508(2). In some cases, the merchant website 508(1) or 508(2) downloaded by the web browser 512 from the merchant web server 506(1) or 506(2) may thus have the control code embedded within the downloaded merchant website, while the website tracking code remains at the merchant web server 506(1) or 506(2). Thus, in some embodiments, the website tracking code may be executed on the merchant web server 506(1) or 506(2), while also communicating or interacting with the control code embedded within the downloaded merchant website 508(1) or 508(2) and executed by the web browser 512 on the user device 510. In other embodiments, the system provider device 502 may provide a control code, as described above, to a merchant web server 506(1) or 506(2), while the website tracking code remains at the system provider device 502. The merchant web server 506(1) or 506(2) may thus embed the control code within the merchant website 508(1) or 508(2), and the merchant website downloaded by a web browser 512 from the merchant web server 506(1) or 506(2) may thus have the control code embedded within the downloaded merchant website. Thus, in some examples, the website tracking code may be executed on the system provider device 502, while also communicating or interacting with the control code embedded within the merchant website 508(1) or 508(2) and executed by the web browser 512 on the user device 510. Regardless of where the website tracking code is executed, the website tracking code is configured to provide a variety of functionality, as discussed herein.

The method proceeds to block 204 where a merchant website is parsed at a user device. In some embodiments, the merchant website is parsed by a web browser or by the website tracking code embedded within the downloaded merchant website. As used herein, the phrase "parsing a merchant website" may be used to describe a process by which data from a merchant website is harvested or extracted, for example, to determine various types of information about the merchant website. For example, in some cases a merchant website may be parsed to identify products or services that are offered by the merchant website. In some examples, a merchant website may be parsed to determine potential actions on the merchant website (e.g., adding an item to a cart, searching for an item, adding an item to a merchant website wish list, etc.). In some cases, "parsing a merchant website" may be alternatively described as "bootstrapping content on a merchant website" or "scraping a merchant website".

Figure 6:
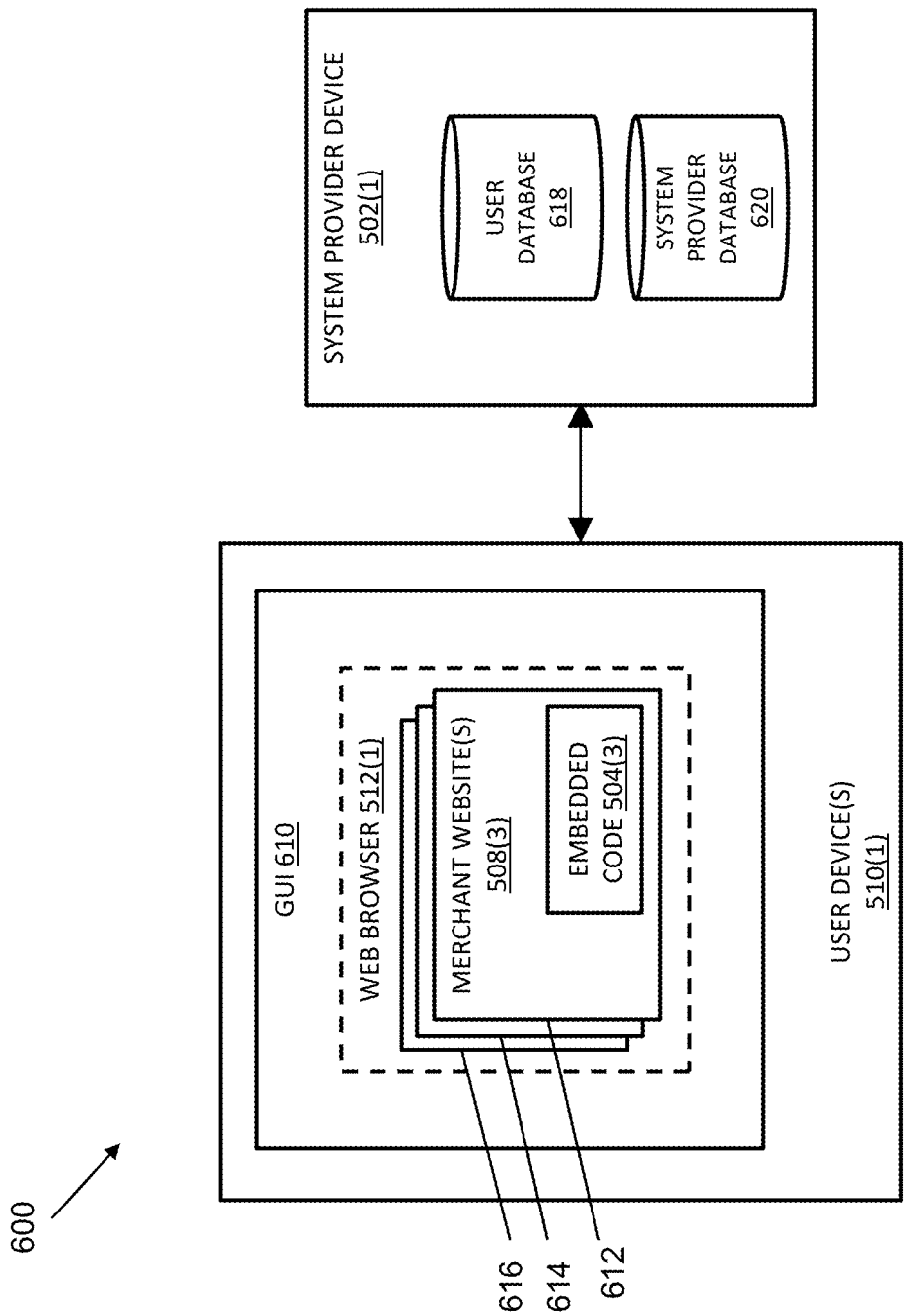
FIG. 6 illustrates an interface between a user device and the system provider device, in accordance with some embodiments.
Figure 8:
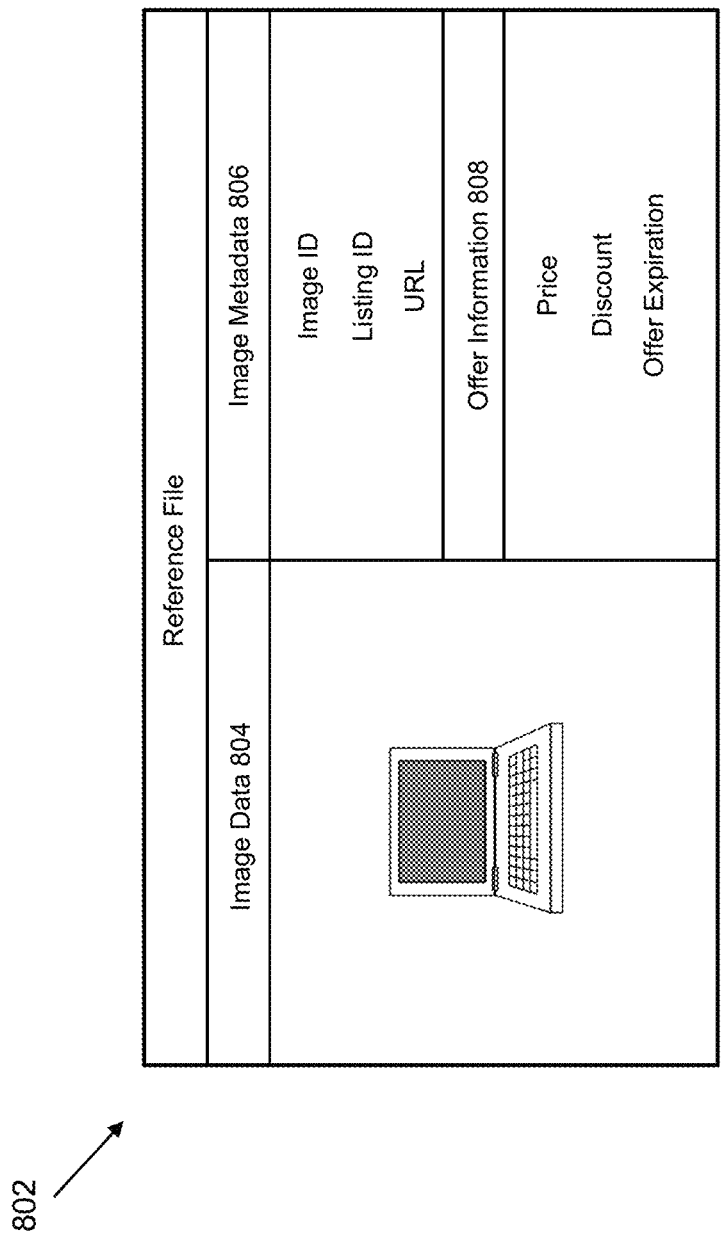
FIG. 8 illustrates an example of a reference file, in accordance with some embodiments.

The method proceeds to block 206 where a user visits a merchant website. For example, again referring to FIG. 5 and in an embodiment of block 206, a user operating the user device 510 may request a particular merchant website (e.g., the merchant website 508(1)) by entering a uniform resource locator (URL) of the particular merchant website into the web browser 512 executing on the user device 510. After performing a domain name system (DNS) lookup to determine an internet protocol (IP) address of the particular merchant website, the web browser 512 sends an HTTP request to an appropriate web server. For example, if the merchant website 508(1) was requested by the user, the HTTP request would be sent to the merchant web server 506(1). In response to the HTTP request, the web server (e.g., the merchant web server 506(1)) will respond by sending files (e.g., HTML files, CSS files, JavaScript files, resource files, etc.) stored on the web server to the user device 510. Stated another way, the user device 510 downloads the files provided by the merchant web server that collectively define the merchant website. Additionally, in some cases, the web server (e.g., the merchant web server 506(1)) may provide one or more cookies, at least one of which is associated with the merchant website. By way of example, the one or more cookies may include a session cookie, a persistent cookie, a secure cookie, a first-party cookie, a third-party cookie, or other type of cookie. In various embodiments, and because the website tracking code was previously embedded into the merchant website (at block 202), the merchant website downloaded from the merchant web server may have the website tracking code embedded within the downloaded merchant website. After downloading of the merchant website, the web browser 512 will render the particular merchant website via a GUI of the user device 510 (e.g., as shown in FIG. 6). While the process of requesting, receiving, and rendering a particular merchant website has been described as including a single request and response, those of skill in the art having benefit of this disclosure will understand that there may in fact be a plurality of requests and responses, as well as other processes that are performed in order to download and render the merchant website.

Elaborating on the above example, reference is made to FIG. 6, which illustrates a user device 510(1). As shown in FIG. 6, the user device 510(1) includes a graphical user interface (GUI) 610, and a web browser 512(1) executing on the user device 510(1) is displayed via the GUI 610. In some examples, the web browser 512(1) may include a plurality of windows 612, 614, 616. In some examples, each of the plurality of windows 612, 614, 616 may display a different merchant website, such as the merchant website 508(3) displayed in the window 612. Further, each of the merchant websites may include an instance of the website tracking code embedded within the merchant website, such as the code 504(3) embedded within the merchant website 508(3).

While the example of FIG. 6 illustrates the plurality of windows 612, 614, 616, in some embodiments, the web browser 512(1) may instead include a plurality of tabs, within which each of the different merchant websites are displayed. In addition, in some cases, different merchant websites may be displayed within different web browsers. However, regardless of how or where the merchant websites are displayed, each of the merchant websites may include an instance of the website tracking code embedded within the merchant website. FIG. 6 additionally illustrates a system provider device 502(1) in communication with the user device 510(1). As discussed above with reference to FIG. 1, the system provider device 502(1) and the user device 510(1) may communicate via a network (e.g., the network 106). In various embodiments, the system provider device 502(1) may include a user database 618 and/or a system provider database 620. In various examples, the user database 618 and/or the system provider database 620 may store user account information, user preference information, the website tracking code, account configuration information, merchant information, as well as sequence identifiers and datasets associated with various interactions between a user and a merchant website, among other information. At least some of the information that may be stored in the user database 618 and/or the system provider database 620 is discussed in more detail below with reference to FIG. 7 and FIG. 8.

In an additional embodiment of block 206, when the user visits a merchant website, the website tracking code embedded within the merchant website determines whether the user has a website tracking system account. In some embodiments, the website tracking system account may include a payment service provider account. In some examples, the website tracking code determines if the user has website tracking system account by providing from the user device, to the system provider device, one or more cookies that include identifying information about the user or the user device. In some cases, the website tracking code may use an optionally hidden inline frame <iframe> to send the one or more cookies, or other identifying information, to the system provider device. In various embodiments, the system provider device then uses the received cookies or other identifying information to determine a website tracking system account status of the user, and to determine personal preferences of the user. In some embodiments, communication between a merchant web servers 506(1), 506(2) and the system provider device 502, and between the user device 510 and the merchant web servers 506(1), 506(2) or the system provider device 502, is performed on a secure communication channel. For example, in some cases, a user may provide authorization credentials (e.g., username and password), or the system provider may recognize the user as being an authorized user, thus creating the secure communication channel. Thus, user privacy and safety is preserved.

In some embodiments, if the system provider device determines (at block 206) that the user does not have a website tracking system account, then the method 200 may optionally proceed to block 207, where a website tracking system account may be created, after which the method 200 proceeds to block 208. In some cases, if the user does not have a website tracking system account, and instead of creating a website tracking system account at block 207, the method 200 may directly proceed to block 210. Alternatively, if the system provider device determines (at block 206) that the user does have an active website tracking system account, then the method 200 may proceed to block 208. In some cases, determining that the user has an active website tracking system account may include matching the identifying information (e.g., provided by the one or more cookies) to user account information stored in the user database 618 and/or the system provider database 620.

Referring now to FIG. 3, and in an embodiment of block 207 where a website tracking system account is created, a user device 300 is illustrated that includes a display 300*a* and which may include a touchscreen user interface. The user device 300, in accordance with various embodiments of the present disclosure, may include a laptop computer, a desktop computer, a mobile phone, a tablet, and/or any of a variety of other type of computing device as known in the art. In various embodiments, a user associated with the user device 300 may launch a system provider application and/or a payment service provider application (e.g., a payment application provided by PayPal™, Inc. of San Jose, Calif.), for example, to request creation of the website tracking system account and/or to update, view, or otherwise interact with a previously created website tracking system account. In some cases, the system provider application and/or the payment service provider application may be automatically launched by the web site tracking code, for example, upon determination that the user does not have a website tracking system account. In some examples, the system provider application and/or the payment service provider application may be presented as a new tab, new window, or pop-up window of the web browser within which the merchant website has been rendered.

In some embodiments, with reference to FIG. 3 and in an embodiment of block 207, upon launching the system provider application or the payment service provider application, the user may be presented with an "Account Creation" screen, as shown in the display 300*a*. In various examples, a user may be prompted to enter authentication information 302 (e.g., email address or user name, and password). After entering the authentication information 302, the user may select a "Create Account" button 310. Upon selecting the "Create Account" button 310, a request to create the website tracking system account, together with the authentication information entered by the user, may be provided to the system provider, and the system provider may use the information to create the website tracking system account. In some examples, the authentication information 302 may be provided during account creation, as described above, after which the system provider may continue to execute the website tracking system, for example, as a background application until otherwise disabled by the user.

After creation of the website tracking system account (at block 207), or after determination (at block 206) that the user does have an active website tracking system account, then the method 200 proceeds to block 208 where a user may view and update their account configuration options. With reference to the example of FIG. 4, an embodiment of block 208 is illustrated. For example, in some embodiments, the system provider application may present the user with an "Account Configuration" screen, as shown in the display 300*a* of FIG. 4. By way of example, the user may be prompted to select from a plurality of configuration options 402. In some embodiments, the selected options 402 may in turn determine, at least in part, the types of interactions between the user and a merchant website that are to be tracked. For purposes of illustration, the configuration options 402 may include selection of the types of interactions to be tracked (e.g., viewed item details, added item to cart, searched for an item, etc.), interactions associated with merchants located within a given distance (e.g., radius) from the user (e.g., 5 miles, 25 miles, 50 miles, etc.), offers associated with items that a user has viewed, added to their cart, searched for, or otherwise interacted with that meet certain types of other requirements (e.g., providing >10% off, providing >$10 off, providing free shipping, providing reward points, etc.), or other types of suitable configuration options.

Moreover, while some examples of information included in the "Account Configuration" screen have been provided, those skilled in the art in possession of the present disclosure will recognize other types of information and/or settings that may be available for user configuration by way of the "Account Configuration" screen, while remaining within the scope of the present disclosure. After entering the account configuration options, the user may select a "Save Configuration" button 404. Additionally, in some embodiments, the "Account Configuration" screen may be called up at a later time, for example to revise the account configuration options. In some embodiments, the "Account Configuration" screen may be called up by clicking on a button within the web browser, where the button may be provided by the website tracking code embedded within the merchant website.

The method 200 proceeds to block 210 where the website tracking code detects interactions between a user and a merchant website while a web browser executing on a user device displays any of a plurality of merchant websites. As described above, the detected interactions may include a user browsing a particular page of a merchant website, clicking on an item to view detailed information about that item, adding an item to a shopping cart, adding an item to a merchant website wish list, searching for an item using a merchant website search tool functionality, or performing some other available action on a merchant website as determined during parsing of the website (block 204). Generally, and by way of example, as the user spends time browsing a merchant website and interacting with the merchant website, the website tracking code detects and saves these interactions, including data associated with the interactions. In some embodiments, the detected interactions, and the data associated with the interactions, may be provided to the system provider via a secure channel, as described above.

For example, data associated with the interactions may include an interaction identifier, a merchant identifier, an interaction type, a sequence identifier, image data, offer data, product or service data, or other associated data. Further information regarding the data associated with the detected interactions is described in more detail below with reference to FIG. 7 and FIG. 8. While the website tracking code may save data associated with a specifically detected interaction, in some cases the website tracking code may further determine and save data associated with similar products or services, for example, by determining a product or service category of the detected interaction and finding related products or services. As one example, consider that a user has added a broom to their shopping cart. The website tracking code will detect this interaction and save data associated with this interaction. Additionally, and because the user added the broom to their shopping cart, the system provider may determine that the user is interested in cleaning products (e.g., a product category). Thus, in some embodiments, the system provider may also save data associated with other cleaning products (e.g., a dustpan, a mop, etc.). In various embodiments, such additional products that the system provider determines to be of possible interest to the user may also be available to the user via interest lists presented to the user, as discussed below.

The method 200 proceeds to block 212 where based on the detected interactions, a sequence of interactions and a sequence identifier are determined. For example, as the website tracking code detects and captures the interactions (block 210), one or more of the detected interactions may be assigned to a particular sequence of interactions. Moreover, in some embodiments, a sequence identifier (sequence ID) may also be generated and assigned (e.g., by the website tracking code) to the particular sequence of interactions. In some embodiments, the sequence ID is merchant specific. In some cases, the sequence ID may provide information regarding an order in which the various interactions were performed. However, in some cases, the sequence ID may simply identify interactions associated with a particular merchant, without specifically identifying the order in which the interactions were performed. In some embodiments, attributes of the sequence ID are configurable at a merchant web server. In various examples, sequence IDs may be collected (e.g., by the website tracking code) for each of a plurality of merchant web sites which the user visits.

The method 200 then proceeds to block 214 where one or more entries of a system provider database are updated. In some embodiments, the one or more entries of the system provider database are updated based on the detected interactions and/or based on the determined sequence of interactions. With reference to FIG. 7, and in an embodiment of block 214, a system provider database 700 is illustrated. As shown in FIG. 7, the system provider database 700 may include entries for an interaction ID, a merchant ID, an interaction type, and a sequence ID. For example, a first interaction (interaction ID 1) may include a user searching for a product (interaction type) on a first merchant's web site (merchant ID A) and assigned a first sequence ID (sequence ID-A), and a second interaction (interaction ID 2) may include a user viewing product details (interaction type) on a second merchant's website (merchant ID B) and assigned a second sequence ID (sequence ID-B). Similarly a third interaction (interaction ID 3) may include a user viewing product details (interaction type) on the first merchant's website (merchant ID A) and assigned the first sequence ID (sequence ID-A), and a fourth interaction (interaction ID 4) may include a user adding an item to a shopping cart (interaction type) on the second merchant's website (merchant ID B) and assigned the second sequence ID (sequence ID-B).

It will be understood that the illustrated database entries are merely exemplary, and that other database entries may be included without departing from the scope of the present disclosure. In various embodiments, the website tracking code may provide the data associated with the interactions (e.g., interaction ID 1, interaction ID 2, interaction ID 3, interaction ID 4), and including the unique sequence IDs, to the system provider device, where the system provider device updates entries of the system provider database 700 to store the data associated with the interactions. In some cases, the website tracking code may use an optionally hidden inline frame <iframe> to send the data associated with the interactions to the system provider device. In various embodiments, one or more entries of the system provider database 700 may indicate one or more products or services offered by a merchant website associated with the merchant ID.

In some embodiments, a reference file 802 (e.g., shown in FIG. 8) may also be stored in the system provider database, for example, for at least some of the detected interactions. In some cases, the reference file 802 may provide additional information regarding a particular item in which a user expressed interest while browsing a merchant website. For example, the reference file 802 may provide additional information regarding an item that a user viewed, added to their shopping cart, added to their wish list, searched for, or otherwise expressed interest in. In some embodiments, the reference file 802 may include image data 804, image metadata 806, and offer information 808. In some embodiments, the image data 804 includes an image extracted (e.g., by the website tracking code) from a merchant website. In some cases, the image metadata 806 may include any of a variety of identifying information such as an image identification (Image ID), as well as a listing identification (Listing ID), and/or a merchandise listing website link for the merchant website offering the item represented by the image data 804.

In some embodiments, the offer information 808 may include any of a variety of information such as offer images, offers URLs, (e.g., which may be associated with an offer image), an offer price and/or discount, offer distance, offer expiration, and/or other pertinent offer information. In some embodiments, the offer information 808 may also include offer type information (e.g., identifying offer as a product or service), as well as offer category information (e.g., electronics, home & garden, sports & outdoors, music, video, health & beauty, automotive, books, toys, kids, baby, games, clothing, and jewelry, among others). In some cases, the offer information 808 may be automatically retrieved by the system provider, for example, by searching various merchant websites for the particular item identified by the image data 804 or by the image metadata 806. In various embodiments, some information/data stored in the reference file 802 may be gleaned, and subsequently stored within the reference file 802, when the interactions are detected (block 210), when the sequence of interactions are determined (212), or at another step during the method 200.

The method 200 then proceeds to block 216 where the sequence of interactions is classified and an associated dataset is generated. In some embodiments, the data collected and provided to the system provider (e.g., data associated with the detected interactions, the sequences of interactions, the sequence identifiers, the reference file 802, etc.) may be processed and classified by the system provider using a big data processing framework. It will be understood, for example based on the extremely large number of users with access to the Internet and based on the multitude of merchant websites currently available, that the website tracking system disclosed herein, and deployed across a plurality of merchant websites, will detect a very large number of interactions and/or determine an equally large number of sequences of interactions. As such, processing of such voluminous data can be quite challenging for traditional data processing applications. Thus, various embodiments of the website tracking system may employ big data processing frameworks for data storage, data processing, data access and analytics, and for data governance and security. For example, in some embodiments, the website tracking system disclosed herein may utilize the Apache Hadoop™ software platform for distributed data storage and processing. In some cases, the web site tracking system may employ the Apache Kafka™ platform, in part, for real-time data streaming and analysis. While some examples of big data processing frameworks that may be used by the website tracking system have been provided, those skilled in the art in possession of the present disclosure will recognize other big data processing frameworks that may be used, while remaining within the scope of the present disclosure.

In some embodiments, the system provider device (e.g., using a big data processing framework) may automatically classify data associated with the detected interactions and/or sequences of interactions, described above. In some examples, the system provider device classifies the data into one or more associated datasets. Stated another way, the data may be classified into the one or more associated datasets according to various parameters that are associated with or correspond to the data. For example, at least some of the various classification parameters used to classify the data may include a website URL, an amount of time spent browsing a webpage, an amount of clicks (e.g., mouse clicks) or interactions a user has for a particular webpage, items added to shopping carts (e.g., across various merchant websites), items searched for (e.g., across various merchant websites), a product or service category, offered deals, or other parameters. In some examples, one or more associated datasets may be referred to as one or more "interest lists", where such interest lists may be similar to "wish lists" or "watch lists" that are used in some existing e-commerce applications. However, in contrast to such existing wish lists or watch lists, the associated datasets (or interest lists) described herein are entirely classified via machine intelligence algorithms (e.g., utilizing a big data processing framework).

Moreover, the interest lists described herein identify products or services in which a user has shown interest, by one or more of the methods previously described, across a plurality of merchant websites. Stated another way, the interest lists described herein provide for convenient consolidation of the products or services in which the user has shown interest for any number of websites that the user has visited. In addition, and in some cases, the system provider may automatically retrieve one or more offers associated with items identified by the interest lists, for example, by searching various merchant websites. The system provider may then append retrieved offers to the interest lists. In some embodiments, and after classification of the data associated with the detected interactions and/or sequences of interactions into the one or more associated datasets, the one or more associated datasets may be managed (e.g., by the system provider) to provide an API. Thereafter, the system provider may thus use the API to provide an application which allows users to view and curate the one or associated datasets (or interest lists), as discussed in more detail below. In some examples, the system provider may use the API to augment information stored in or available via a user's digital wallet, such as a digital wallet provided by a payment service provider (e.g., PayPal™, Inc.). In some cases, the user's digital wallet may thus be used to save interest lists, or more generally to save a user's shopping history across a plurality of merchant websites.

The method 200 then proceeds to block 218 where a GUI of the user device is caused to display the associated dataset. With reference to the example of FIG. 9, and in embodiment of block 218, a user device 510(2) including a GUI 610(1) and showing an example of payment service provider application window 902 including an interest list view 904 is illustrated. As noted above, the one or more associated datasets may be referred to as one or more "interest lists", thus the interest list view 904 may be equivalently referred to as an associated dataset view 904. In various embodiments, the interest list view 904 may be provided in the application window 902, in a new browser tab (e.g., in contrast to a web browser tab a user may be using to view a merchant website), in a new browser window, or in a separate browser window or tab. In some cases, the interest list view 904 may be provided, for example, as a pop-up window displayed over a browser window used to display a merchant website. In some embodiments, the interest list view 904 may include a plurality of items 908A, 908B, 908C, 908D, which represent items in which the user has expressed interest in, by interacting with a merchant website for example, by way of clicking on an item to view detailed information, by adding an item to a shopping cart, by saving an item to a merchant website wish list, by spending a particular amount of time browsing a particular page of the merchant website, by searching for a particular item, or by another available method. Thus, the interest list view 904 provides a consolidated view of the products or services in which the user has shown interest for any number of websites that the user has visited.

Figure 9:
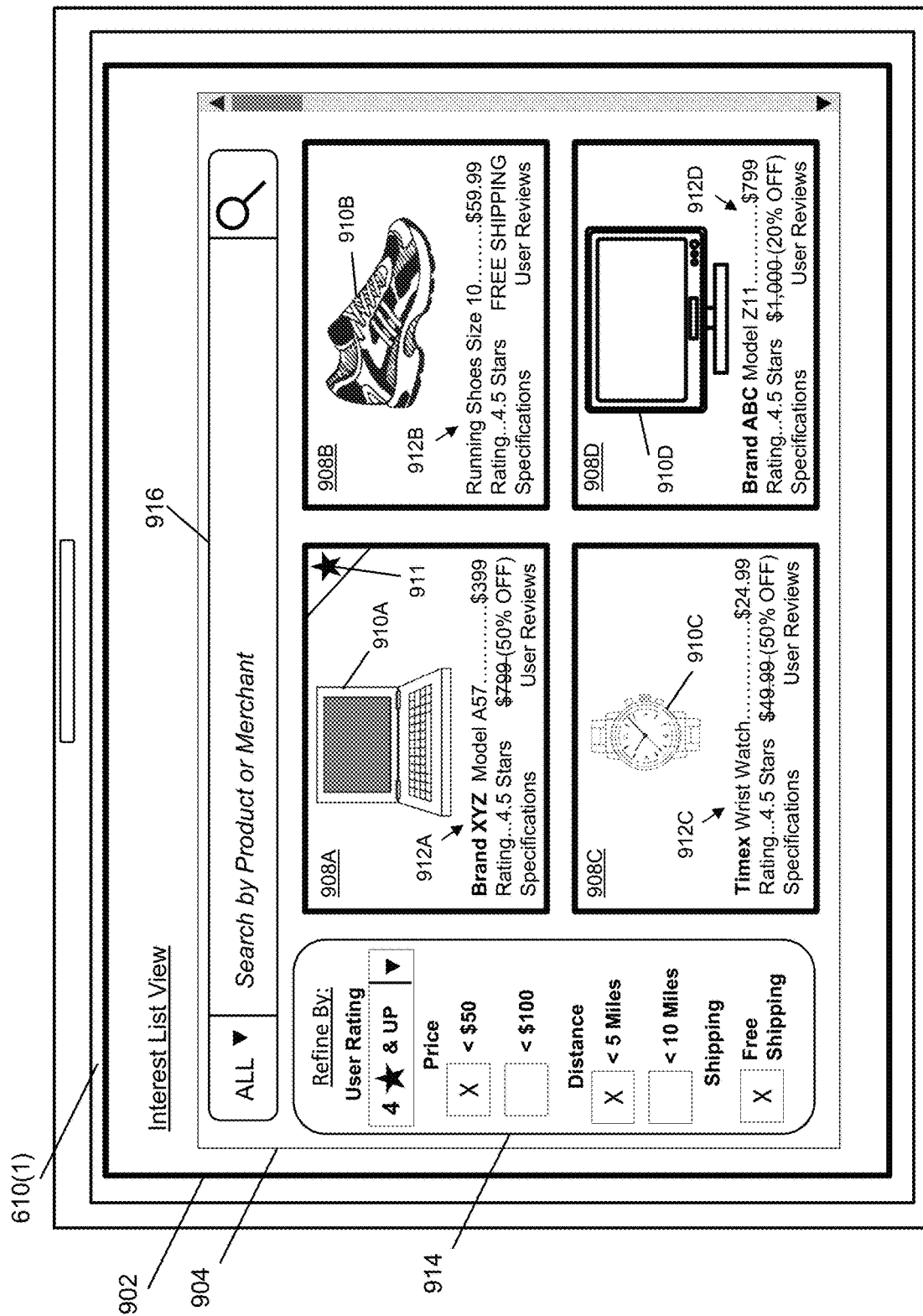
FIG. 9 illustrates a payment service provider application window including an interest list view, in accordance with some embodiments.

Still referring to the example of FIG. 9, additional details regarding the interest list view 904 are now provided. As mentioned above, the interest list view 904 may include a plurality of items 908A, 908B, 908C, 908D. As shown, each of the plurality of items 908A, 908B, 908C, 908D may further include an image 910A, 910B, 910C, 910D, as well as offer information 912A, 912B, 912C, 912D. In various embodiments, the images and offer information shown for each of the plurality of items 908A, 908B, 908C, 908D may include information previously collected, based on the detected interactions, as described above. Thus, by way of example, the images 910A, 910B, 910C, 910D may include the image data 804, and the offer information 912A, 912B, 912C, 912D may include the offer information 808, from any of a plurality of reference files 802. In addition, website link (e.g., URLs) data (e.g., stored in the reference files 802) may be associated with any of the images 910A, 910B, 910C, 910D and/or with text provided within the offer information 912A, 912B, 912C, 912D. As such, a user may click on such links (e.g., embedded within an image or text) to be taken to an associated merchant website to complete a purchase transaction. To be sure, in some examples, the user may click on such links to directly purchase the item shown and/or described directly via the interest list view 904 of the payment service provider application window 902.

In some embodiments, one or more of the plurality of items 908A, 908B, 908C, 908D may also include an identifier 911. By way of example, the identifier 911 may be used to indicate that the particular item is an item in which the user may have a particularly special interest. For example, in some cases, the special interest item may include one which meets one or more of the selected account configuration options 402 of FIG. 4. In some examples, the special interest item may include time-sensitive offers, for example, as determined by a user calendar accessible via the user device. For instance, the user calendar may include information regarding birthdays, anniversaries, holidays, or other important dates, and the system provider may thus highlight certain items (e.g., flowers, balloons, spa treatments, etc.) as being of special interest to the user, based at least in part on the calendar information.

In various examples, another feature of the interest list view 904 may include an option to filter and/or refine the items shown in the interest list view 904. In some cases, this feature may be provided by a filter menu 914, as shown in FIG. 9. In some embodiments, the filter menu 914 may provide for filtering and/or refining the items shown according to any of a variety of parameters such as user rating, price, distance, whether the item provides free shipping, or any other appropriate filter. In the example of FIG. 9, the filter menu 914 indicates that the user wants to see items having a user rating of four stars and up, items having a price less than fifty dollars, items less than five miles away, and items including free shipping. Thus, while the system provider may have initially provided more items visible via the interest list view 904 as a result of interaction detection and data classification, the user may filter the items shown by activating one or more of the filters available in the filter menu 914. How the user filters the items may also be used by the system or the machine learning to alter "default" arrangements of interest list view 904 in subsequent displays, such that the system can "learn" how the user may prefer a listing to be viewed.

In another embodiment, interest list view 904 may be configured based on a number of factors, including what the system may think is of most interest to the user. This data may be obtained or determined based on any number of factors, such as, but not limited to, time spent viewing an item, number of clicks on an item, a time of year (e.g., Valentine's Day), a calendar event (e.g., a vacation to a specific location or a birthday party), most highly discounted, specific merchants the user is known to shop at or with more frequency, etc.

In some embodiments, the system provider may further provide a search functionality, allowing the user to search offers presented via the interest list view 904. For example, as shown in FIG. 9, a search bar 916 is provided. In some embodiments, the search bar 916 accepts a user input, where the user input is used by the system provider to query a database, which may include the system provider database 700 and/or a plurality of reference files 802. As a result of the user search via the search bar 916, the items shown via the interest list view 904 may be filtered according to the user input. It is also noted that the search functionality described may be combined with other filtering/refining options, such as provided by the filter menu 914.

Figure 10:
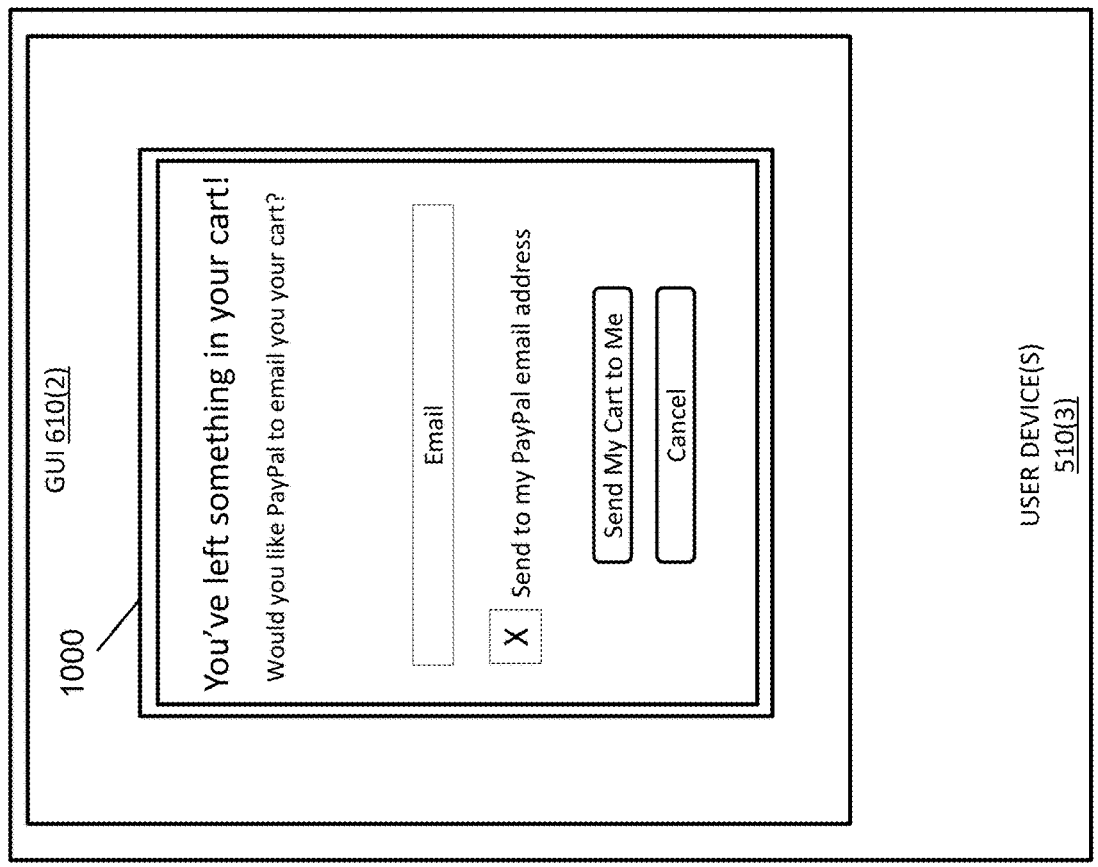
FIG. 10 illustrates an alternative embodiment of a payment service provider application window, in accordance with some embodiments.

With reference to FIG. 10, illustrated therein is an alternative embodiment of block 218, where rather than displaying the associated dataset immediately through a GUI, the associated dataset is emailed to the user for later viewing. For example, consider that a user is browsing a merchant website, while the website tracking system executes as a background application. Consider further that the user added an item to their cart at the merchant website without purchasing the item. Thereafter, the user may choose to close the web browser window or tab that was displaying the merchant website, or the user may simply browse to another webpage without purchasing the item. In response, the website tracking system may cause a user device 510(3), including a GUI 610(2), to display a window 1000. In various embodiments, the window 1000 may be provided in a payment service provider application window, in a new browser tab (e.g., in contrast to a web browser tab a user may be using to view a merchant website), in a new browser window, or in a separate browser window or tab. In some cases, the window 1000 may be provided, for example, as a pop-up window displayed over a browser window used to display a merchant website. As shown in the example of FIG. 10, the window 1000 may be used to notify a user that an item has been left in their cart (e.g., in a cart associated with a merchant website).

Additionally, the window 1000 may provide an option to the user to have their cart, including information about the item left in their cart, emailed to them. As such, the window 1000 may further provide a field 1002 for a user to enter their email address and/or a box 1004 that the user may select to indicate that the cart should be emailed to their email address. The window 1000 may also include a button 1006 that initiates sending of the email, with the cart information, to the user at the email address indicated. In some embodiments, after clicking the button 1006 to send the email, the window 1000 may close. In some cases, the window 1000 may also include a button 1008, to cancel sending the email and thereby close the window. While the example of FIG. 10 has been shown and described with reference to a user leaving an item in their cart, it will be understood that a similar method may be used, for example, for items that a user has clicked on, for items viewed for a certain amount of time, for items that the user searched for, or for other items in which the user has expressed interest in, as described above.

It will be understood that the examples given above, for example with reference to the method 200, are merely exemplary and are not meant be limiting in any way. Moreover, those of skill in the art in possession of this disclosure will recognize that various additional embodiments may be implemented in accordance with the methods described herein, while remaining within the scope of the present disclosure. For example, while various embodiments disclosed herein were discussed with reference to one or more merchant websites being displayed via a web browser executing on a user device, at least some alternative embodiments include accessing different merchant websites by way of different applications executing on the user device. For example, in some cases, a first social media app (e.g., Facebook™) may be used to access and display a first merchant website, and a second social media app (e.g., Instagram™) may be used to access and display a second merchant website.

Alternatively, a web browser app may be used to access and display a first merchant website, and a social media app may be used to access and display a second merchant website. In some embodiments, a first web browser app (e.g., Chrome™) may be used to access and display a first merchant website, and a second browser app (e.g., Firefox™) may be used to access and display a second merchant website. In general, it will be understood that the method of accessing and displaying a merchant website is not limiting to the various embodiments disclosed herein. As such, in some examples, the website tracking code may be embedded within a social media app or within another app that is used to access a merchant website. Alternatively, in some embodiments, the website tracking code may simply remain on a merchant web server, without being downloaded to a user device, while providing the described functionality of the website tracking system.

Thus, systems and methods have been described that provide for a website tracking system that tracks user activity across a plurality of merchant websites and provides a consolidated wish list or interest list that streamlines the user shopping experience. In some cases, as described below, the website tracking system may also automatically retrieve and save deals or offers to the consolidated wish list, further enhancing the user shopping experience. In various embodiments, the website tracking system disclosed herein may include code provided by a payment service provider to a plurality of merchant web servers. A merchant web server, after receiving the code from the payment service provider, may embed the code within a merchant website. As a result, a merchant website downloaded by a web browser (e.g., executing on a user device) from a merchant web server may have the code embedded within the downloaded merchant web site. In some cases, the embedded website tracking code may thus be executed by the web browser on the user device. Alternatively, in some embodiments, the merchant web server may embed a control code within the merchant website such that a merchant website downloaded by a web browser may thus have the control code embedded within the downloaded merchant website, while the website tracking code remains at the merchant web server. Thus, in some embodiments, the website tracking code may be executed on the merchant web server, while also communicating or interacting with the control code embedded within the merchant website and executed by the web browser on the user device. In other embodiments, the payment service provider may provide a control code to a merchant web server for embedding within the merchant web site, while the website tracking code remains at the payment service provider. Thus, in some examples, the website tracking code may be executed on the payment service provider, while also communicating or interacting with the control code embedded within the merchant website and executed by the web browser on the user device. In various embodiments, a user may browse to and interact with a plurality of merchant websites, and the website tracking system may detect one or more interactions between the user and one or more merchant websites. In some examples, the website tracking system may classify identified items, based at least in part on the detected interactions, into one or more interest lists. Thereafter, in some cases, the website tracking system may use the one or more interest lists to provide an API, and an application provided by the payment service provider may leverage this API to allow users to view and curate their personal interest lists.

Various examples of technological devices and systems that may be used to implement embodiments of the present disclosure are discussed in more detail below with reference to FIGS. 11-14.

Figure 11:
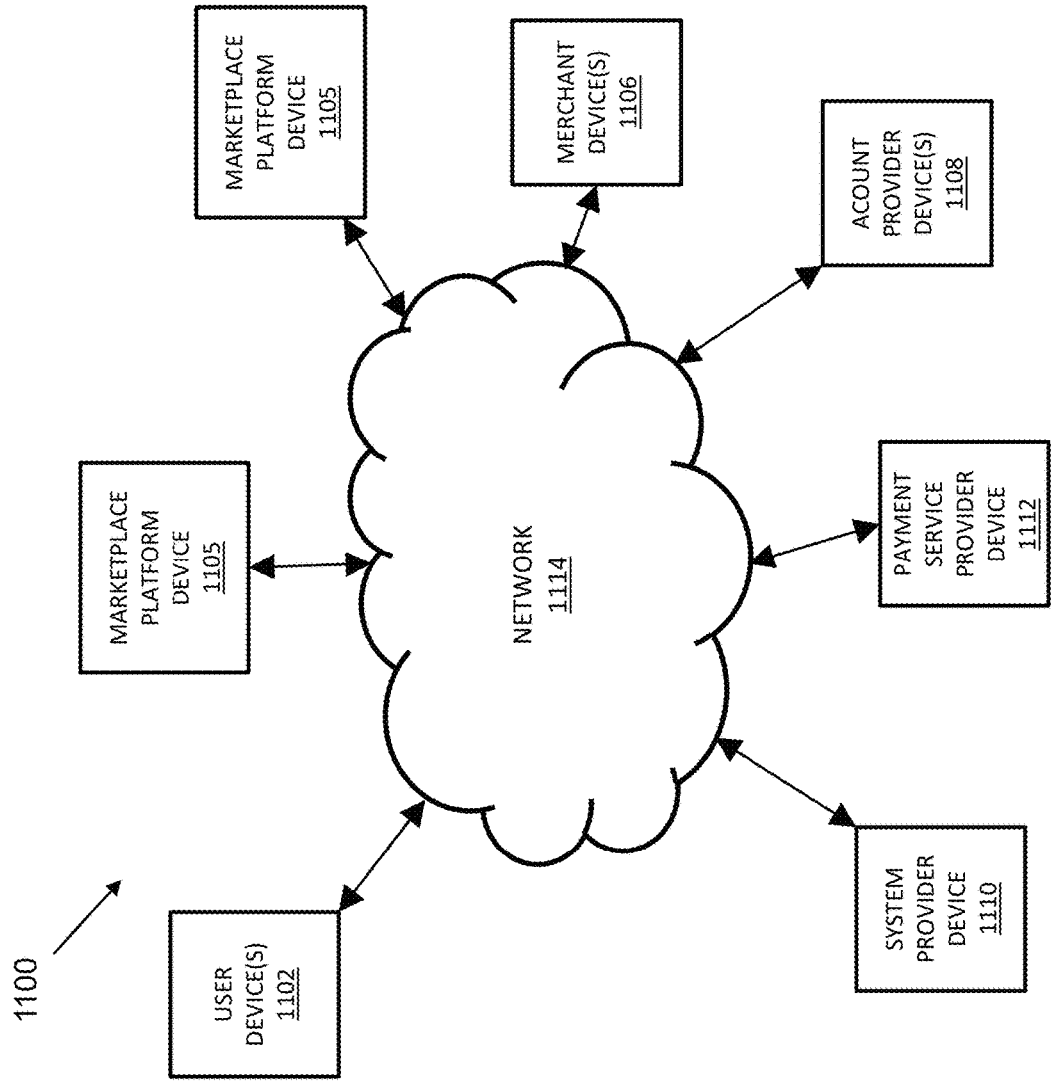
FIG. 11 is a schematic view illustrating an embodiment of a networked system.

Referring first to FIG. 11, an embodiment of a network-based system 1100 for implementing one or more processes described herein is illustrated. As shown, the network-based system 1100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 11 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1100 illustrated in FIG. 11 includes a plurality of user devices 1102, a plurality of marketplace platform devices 1105, a plurality of merchant devices 1106, a payment service provider device 1112, an account provider device(s) 1108, and/or a system provider device 1110 in communication over one or more networks 1114. The user devices 1102 may be the user devices discussed above and may be operated by the users discussed above. The marketplace platform devices 1105 may be the marketplace platform devices discussed above and may be operated by the marketplace platforms discussed above. The merchant devices 1106 may be the merchant devices discussed above and may be operated by the merchants discussed above. The payment service provider device 1112 may be the payment service provider devices discussed above and may be operated by a payment service provider such as, for example, PayPal™ Inc. of San Jose, Calif. The system provider devices 1110 may be the system provider devices discussed above and may be operated by the system providers discussed above, and in some cases may include a payment service provider device operated by a payment service provider such as, for example, PayPal™ Inc. of San Jose, Calif. The account provider devices 1108 may be operated by credit card account providers, bank account providers, savings account providers, and a variety of other account providers known in the art.

The user devices 1102, marketplace platform devices 1105, merchant devices 1106, payment service provider device 1112, account provider device 1108, and/or system provider device 1110 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1100, and/or accessible over the network 1114.

The network 1114 may be implemented as a single network or a combination of multiple networks. For example, in various embodiments, the network 1114 may include the Internet and/or one or more intranets, landline networks, wireless networks, and/or other appropriate types of networks.

The user devices 1102, marketplace platform devices 1105, merchant devices 1106, payment service provider device 1112, account provider device 1108, and/or system provider device 1110 may be implemented using any appropriate combination of hardware and/or software configured for wired and/or wireless communication over network 1114. For example, in one embodiment, the user devices 1102, marketplace platform devices 1105, and/or merchant devices 1106 may be implemented as a personal computer of a user in communication with the Internet. In other embodiments, the user devices 1102, marketplace platform devices 1105, and/or merchant devices 1106 may be a smart phone, wearable computing device, laptop computer, and/or other types of computing devices.

The user devices 1102, marketplace platform devices 1105, and/or merchant devices 1106 may include one or more browser applications which may be used, for example, to provide a convenient interface to permit the customer to browse information available over the network 1114. For example, in one embodiment, the browser application may be implemented as a web browser configured to view information available over the Internet.

The user devices 1102, marketplace platform devices 1105, and/or merchant devices 1106 may also include one or more toolbar applications which may be used, for example, to provide user-side processing for performing desired tasks in response to operations selected by the user. In one embodiment, the toolbar application may display a user interface in connection with the browser application.

The user devices 1102, marketplace platform devices 1105, and/or merchant devices 1106 may further include other applications as may be desired in particular embodiments to provide desired features to the user devices 1102, marketplace platform devices 1105, and/or merchant devices 1106. The other applications may also include security applications for implementing user-side security features, programmatic user applications for interfacing with appropriate application programming interfaces (APIs) over the network 1114, or other types of applications. Email and/or text applications may also be included, which allow a user to send and receive emails and/or text messages through the network 1114. The user devices 1102, marketplace platform devices 1105, and/or merchant devices 1106 may include one or more user and/or device identifiers which may be implemented, for example, as operating system registry entries, cookies associated with the browser application, identifiers associated with hardware of the user devices 1102, marketplace platform devices 1105, and/or merchant devices 1106, or other appropriate identifiers, such as a phone number. In one embodiment, the user identifier may be used by the system provider or payment service provider to associate the user with a particular account as further described herein.

The merchant devices 1106 and/or marketplace platform devices 1105 may be maintained, for example, by a conventional or online merchant, conventional or digital goods seller, individual seller, e-commerce marketplaces, other online marketplace platforms, and/or application developer offering various products and/or services in exchange for payment to be received conventionally or over the network 1114. In this regard, the merchant device 1106 and marketplace platform devices 1105 may include a database identifying available products and/or services (e.g., collectively referred to as items) which may be made available for viewing and purchase by the user.

The merchant devices 1106 and/or marketplace platform devices 1105 may also include a checkout application which may be configured to facilitate the purchase by the payer of items. The checkout application may be configured to accept payment information from the user through the user devices 1102, the account provider through the account provider device 1108, and/or from the payment service provider through the payment service provider device 1112 over the network 1114. The merchant devices 1106 and/or marketplace platform devices 1105 may also include a system provider application, as described above, to implement one or more aspects of the method 200 and/or other aspects of the various embodiments described herein.

Figure 12:
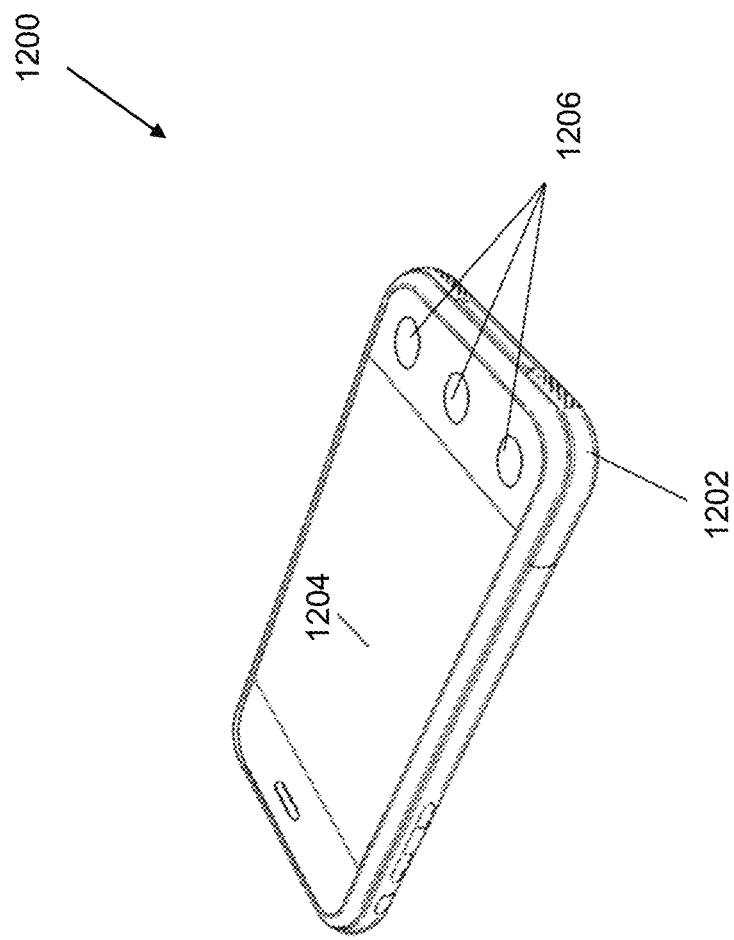
FIG. 12 is a perspective view illustrating an embodiment of a user device.

Referring now to FIG. 12, an embodiment of a user device 1200 is illustrated. The user device 1200 may be the user device 102, 300, 510, 510(1), 510(2), 510(3), or 1102 discussed above. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 13:
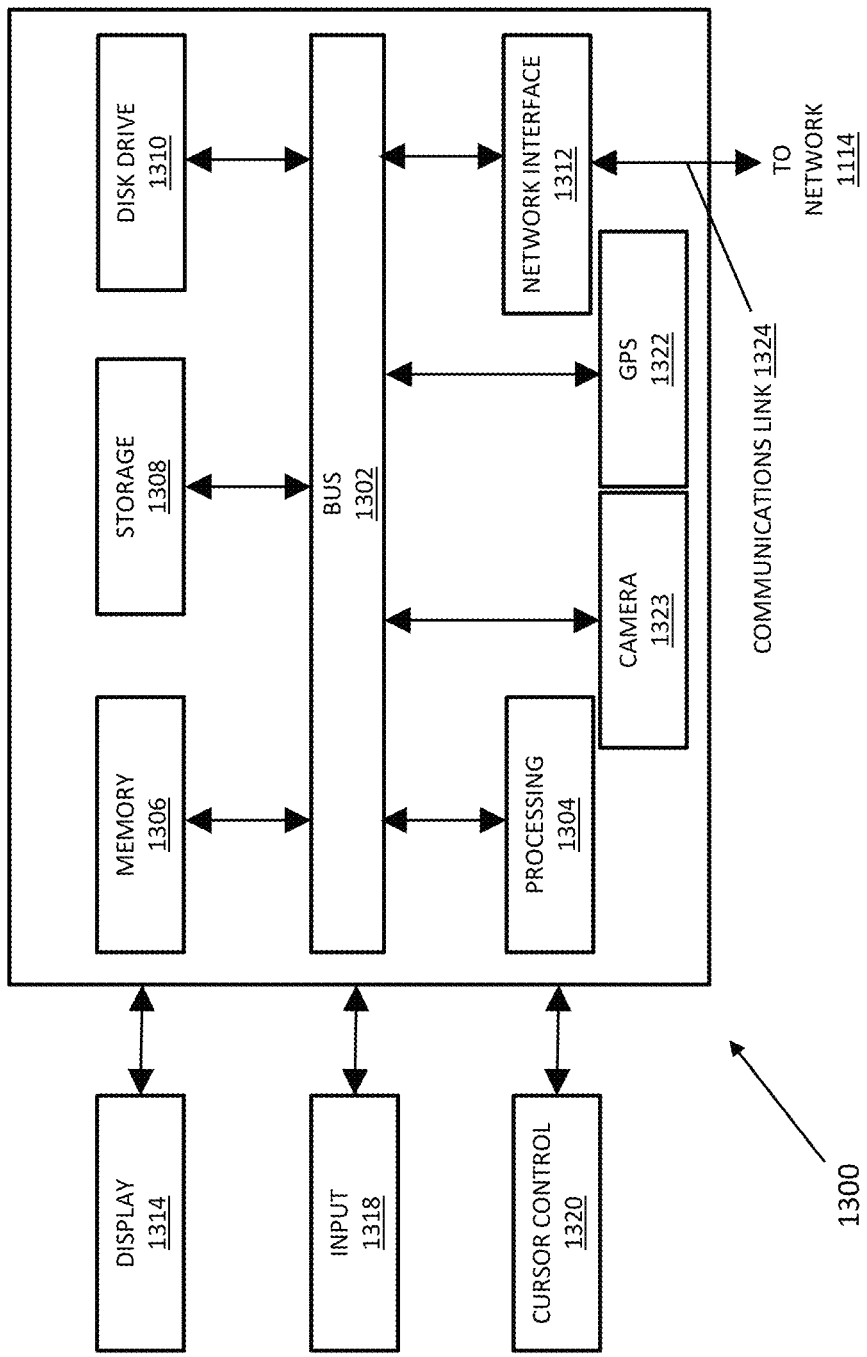
FIG. 13 is a schematic view illustrating an embodiment of a computer system.

Referring now to FIG. 13, an embodiment of a computer system 1300 suitable for implementing, for example, the user devices 102, 300, 510, 510(1), 510(2), 510(3), 1102, or 1200, marketplace platform devices 1105, merchant devices 1106, payment service provider device 1112, account provider device 1108, and/or system provider device 1110, is illustrated. It should be appreciated that other devices utilized by customers, webmail providers, marketplace platforms, merchants, payment service providers, account providers, and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 1322 (e.g., a Global Positioning System (GPS) device as illustrated, a cell tower triangulation device, and/or a variety of other location determination devices known in the art), and/or a camera component 1323. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user devices 102, 300, 510, 510(1), 510(2), 510(3), 1102, or 1200, marketplace platform devices 1105, merchant devices 1106, payment service provider device 1112, account provider device 1108, and/or system provider device 1110. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
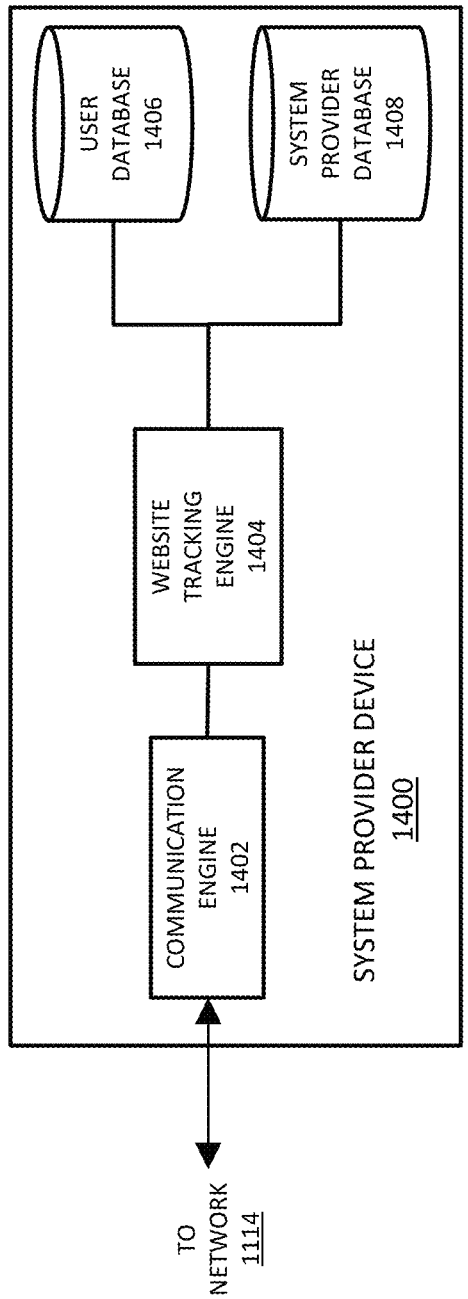
FIG. 14 is a schematic view illustrating an embodiment of a system provider device.

Referring now to FIG. 14, an embodiment of a system provider device 1400 is illustrated. In an embodiment, the device 1400 may be the system provider devices discussed above. The device 1400 includes a communication engine 1402 that is coupled to the network 1114 and to website tracking engine 1404 that is coupled to a user information database 1406 and a system provider database 1408. The communication engine 1402 may be software or instructions stored on a computer-readable medium that allows the device 1400 to send and receive information over the network 1114. The website tracking engine 1404 may be software or instructions stored on a computer-readable medium that, when executed by a processor, is configured to parse a merchant website, display and update account configuration options, detect interactions between a user and one or more merchant websites, determine a sequence of interactions and sequence identifiers, update entries of the user information database 1406 or the system provider database 1408, classify the sequence of interactions and generate an associated dataset (or interest list), cause a GUI of the user device to display the associated dataset, as well as provide any of the other functionality that is discussed above. While the databases 1406 and 1408 have been illustrated as located in the device 1400, one of skill in the art will recognize that they may be connected to the website tracking engine 1404 through the network 1114 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   one or more hardware processors configured to execute the instructions to cause the system to perform operations comprising:
   responsive to an HTTP request from a web browser executing on a user device, receiving a first set of files defining a first merchant website from a web server, the first set of files including a first instance of a tracking code, the first instance of the tracking code configured for execution by the web browser as a background application while the web browser displays the first merchant website, and the first instance of the tracking code configured to monitor interactions between a user operating the user device and the web browser;
   while displaying the first merchant website on the web browser, detecting, by the first instance of the tracking code executed by the web browser, a first interaction between the user and the web browser, the first interaction including the user providing input via a user-selectable element displayed within the first merchant website, wherein the detecting the first interaction collects data associated with the first interaction;
   independent of manual user input from the user, transmitting via a secure network communication channel the data associated with the first interaction, and data associated with a second interaction between the user and the web browser that was detected by a second instance of the tracking code executed by the web browser as the background application while displaying a second merchant website on the web browser, to a system provider device for classification of the data associated with the first interaction and the second interaction into one or more interest lists using a machine intelligence algorithm and for providing an application program interface (API) accessible to the user device for viewing the one or more interest lists; and in response to communicating with the API over the secure network communication channel, causing to be displayed, on a graphical user interface (GUI) of the user device, a first interest list of the one or more interest lists generated by the system provider device independent of the manual user input, wherein the displayed first interest list includes a first image associated with a first item or a first website link associated with the first item.

2. The system of claim 1, wherein the operations further comprise:

responsive to the HTTP request, receiving a second set of files defining the second merchant website from the web server, the second set of files including the second instance of the tracking code, the second instance of the tracking code configured for execution by the web browser as the background application while the web browser displays the second merchant website, and the second instance of the tracking code configured to monitor interactions between the user operating the user device and the web browser;

while displaying the second merchant website on the web browser, detecting, by the second instance of the tracking code executed by the web browser, the second interaction between the user and the web browser, the second interaction including at least one of the user clicking on a second item displayed within the second merchant website, adding the second item to a second shopping cart associated with the second merchant website, or searching for the second item using a second website search tool associated with the second merchant website, wherein the detecting the second interaction collects the data associated with the second interaction; and in response to communicating with the API over the secure network communication channel, causing to be displayed, on the GUI of the user device, a second interest list of the one or more interest lists generated by the system provider device independent of the manual user input, wherein the displayed second interest list includes a second image associated with the second item or a second website link associated with the second item.

3. The system of claim 1, wherein the operations further comprise:

prior to the detecting, providing a cookie that includes identifying information about the user to the system provider device; and in response to providing the cookie, determining an account status of the user.

4. The system of claim 3, wherein the operations further comprise:

determining the account status of the user, the account status including an active status, and the active status indicating that the identifying information matched user account information stored in a system provider database;

after determining the active status, causing to be displayed, on the GUI of the user device, an application window including one or more user-selectable fields corresponding to a plurality of available interaction types between the user and the web browser displaying the first merchant website; and in response to a selection of at least a subset of the one or more user-selectable fields, restricting the detecting to interactions, of the plurality of available interaction types, that correspond to the subset of the one or more user-selectable fields.

5. The system of claim 1, wherein the user providing input via the user-selectable element includes at least one of the user clicking on the first item displayed within the first merchant website, the user adding the first item to a first shopping cart associated with the first merchant website, or the user searching for the first item using a first website search tool associated with the first merchant website.

6. The system of claim 1, wherein the operations further comprise:

detecting a selection, via the GUI of the user device, of the first image or the first website link associated with the first item; and in response to detecting the selection, completing a purchase transaction for the first item without once again displaying the first merchant website on the web browser.

7. The system of claim 2, wherein the operations further comprise:

while displaying the first merchant website on the web browser, detecting, by the first instance of the tracking code executed by the web browser, a third interaction between the user and the web browser, wherein the detecting the third interaction collects data associated with the third interaction;

while displaying the second merchant website on the web browser, detecting, by the second instance of the tracking code executed by the web browser, a fourth interaction between the user and the web browser, wherein the detecting the fourth interaction collects data associated with the fourth interaction;

independent of manual user input from the user operating the user device, transmitting the data associated with the third interaction and the fourth interaction to the system provider device via the secure network communication channel, the system provider device configured to update the first interest list based on the data associated with the third interaction, and the system provider device configured to update the second interest list based on the data associated with the fourth interaction; and in response to communicating with the API over the secure network communication channel, causing to be displayed, on the GUI of the user device, an updated first interest list or an updated second interest list.

8. The system of claim 1, wherein the classification of the data associated with the first interaction and the second interaction into the one or more interest lists using the machine intelligence algorithm includes classifying the data associated with the first interaction and the data associated with the second interaction using a distributed data storage and processing platform.

9. The system of claim 1, wherein the system provider is configured to use the API to augment information available to the user via a digital wallet application executing on the user device, and wherein the operations further comprise:

in response to communicating with the API over the secure network communication channel, causing to be displayed, on an application window of the digital wallet application, the first interest list of the one or more interest lists generated by the system provider device independent of the manual user input.

10. The system of claim 1, wherein the operations further comprise:
 detecting that the web browser displaying the first merchant website has been closed by the user operating the user device; and
 in response to detecting that the web browser has been closed, causing to be displayed, on the GUI of the user device, a payment service provider application window, the payment service provider application window prompting the user to enter an email address to which to send the first interest list.

11. A method for tracking activity using a website-embedded code, comprising:
 receiving, at a user device executing a web browser, a set of files defining a merchant website from a web server, the set of files including a control code configured for execution by the web browser, the control code providing an inline frame <iframe> within the merchant website, and the control code configured to interact with a tracking code configured for execution by the web server while the web browser displays the merchant website, the tracking code configured to monitor interactions between a user operating the user device and the web browser;
 while displaying the merchant website on the web browser, detecting, by the tracking code executed by the web server in communication with the control code executed by the web browser, an interaction between the user and the web browser, the interaction including the user clicking on an item displayed within the merchant website, wherein the detecting the interaction collects data associated with the interaction;
 after detecting the interaction, and without additional user input from the user operating the user device, transmitting the data associated with the interaction, and data associated with another interaction between the user and the web browser that was detected by the tracking code executed by the web server in communication with the control code executed by the web browser while displaying another merchant website on the web browser, to a system provider device using the inline frame <iframe>, the system provider device configured to classify the data associated with the interaction and the another interaction into an interest list using a distributed data storage and processing platform and to provide an application program interface (API) accessible to the user device for viewing the interest list; and
 accessing, by a payment service provider application, the API to cause the interest list to be displayed via an application window of the payment service provider application, wherein the displayed interest list includes an image associated with the item displayed within the merchant website or a website link associated with the item displayed within the merchant website.

12. The method of claim 11, further comprising:
 prior to the detecting the interaction, parsing the merchant website to determine available actions between the user and the web browser displaying the merchant website.

13. The method of claim 11, further comprising:
 prior to the detecting the interaction, transmitting a cookie that includes identifying information about the user to the system provider device; and
 in response to transmitting the cookie, determining an account status of the user.

14. The method of claim 13, further comprising:
 determining the account status of the user includes an active status;
 after determining the active status, causing to be displayed, on a graphical user interface (GUI) of the user device, another application window of the payment service provider application including one or more user-selectable fields corresponding to a plurality of available interaction types between the user and the web browser displaying the merchant website; and
 responsive to selecting a subset of the one or more user-selectable fields, restricting the detecting to interactions, of the plurality of available interaction types, that correspond to the subset of the one or more user-selectable fields.

15. The method of claim 13, wherein the transmitting the cookie includes transmitting the cookie using the inline frame <iframe>.

16. The method of claim 14, wherein the distributed data storage and processing platform uses the selected subset of the one or more user-selectable fields to determine a user preference for displaying the interest list, and wherein a subsequent rendering of the interest list displayed via the application window of the payment service provider application is modified based on the determined user preference.

17. The method of claim 11, wherein the data associated with the interaction and the another interaction includes an interaction identifier, a merchant identifier, an interaction type, a sequence identifier, image data, offer data, product data, or service data.

18. A non-transitory machine-readable medium having stored thereon machine-readable instructions executable to cause a machine to perform operations comprising:
 rendering a merchant website on a web browser executing on a user device, the merchant website defined by a set of files received from a web server, the set of files including an instance of a tracking code, the instance of the tracking code configured for execution by the web browser as a background application while the web browser displays the merchant website, and the instance of the tracking code configured to monitor interactions between a user operating the user device and the web browser;
 while displaying the merchant website on the web browser, detecting, by the instance of the tracking code executed by the web browser, a user interaction between the user and the web browser, the user interaction including the user providing input via a user-selectable element displayed within the merchant website, wherein the detecting the user interaction collects data associated with the user interaction;
 after detecting the user interaction, and independent of further user input, sending the data associated with the user interaction, and data associated with another user interaction between the user and the web browser that was detected by another instance of the tracking code executed by the web browser as the background application while displaying another merchant website on the web browser, to a system provider device for generation of an interest list and for providing an application program interface (API) accessible to the user device for viewing the interest list; and
 causing to be displayed, on a graphical user interface (GUI) of the user device and based on communication with the API, the interest list generated by the system provider device independent of the further user input.

19. The non-transitory machine-readable medium of claim 18, wherein the operations further comprise:

sending the data associated with the user interaction and the another user interaction to the system provider device, wherein the system provider device is configured to classify the data associated with the user interaction and the another user interaction using a big data processing framework, the big data processing framework including a distributed data storage and processing platform, to generate the interest list.

20. The non-transitory machine-readable medium of claim 19, wherein the big data processing framework used to classify the data associated with the user interaction and the another user interaction further provides for real-time data streaming and real-time data analysis.

\* \* \* \* \*